United States Patent
Ye et al.

(10) Patent No.: US 12,250,660 B2
(45) Date of Patent: Mar. 11, 2025

(54) POWER SAVING SENSING FOR REDUCED SENSING UES USING PARTIAL SENSING AND ADDITIONAL SENSING WITH A PRIORITIZED RESOURCE SELECTION WINDOW

(71) Applicant: APPLE INC., Cupertino, CA (US)

(72) Inventors: Chunxuan Ye, San Diego, CA (US); Chunhai Yao, Beijing (CN); Dawei Zhang, Cupertino, CA (US); Haitong Sun, Cupertino, CA (US); Hong He, Cupertino, CA (US); Huaning Niu, Cupertino, CA (US); Oghenekome Oteri, San Diego, CA (US); Seyed Ali Akbar Fakoorian, Cupertino, CA (US); Sigen Ye, San Diego, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 562 days.

(21) Appl. No.: 17/593,692

(22) PCT Filed: Jan. 14, 2021

(86) PCT No.: PCT/CN2021/071860
§ 371 (c)(1),
(2) Date: Sep. 22, 2021

(87) PCT Pub. No.: WO2022/151211
PCT Pub. Date: Jul. 21, 2022

(65) Prior Publication Data
US 2023/0180186 A1 Jun. 8, 2023

(51) Int. Cl.
*H04W 72/02* (2009.01)
*H04W 28/06* (2009.01)
(Continued)

(52) U.S. Cl.
CPC ........... *H04W 72/02* (2013.01); *H04W 28/26* (2013.01); *H04W 72/0446* (2013.01); *H04W 72/563* (2023.01)

(58) Field of Classification Search
CPC ... H04W 72/02; H04W 72/563; H04W 28/26; H04W 72/0446
See application file for complete search history.

(56) References Cited

U.S. PATENT DOCUMENTS 11,871,380 B2 * 1/2024 Li .................... H04W 28/26
12,133,119 B2 * 10/2024 Nguyen .............. H04W 72/20
(Continued)

FOREIGN PATENT DOCUMENTS

| CN | 111194057 A | 5/2020 |
| CN | 111586722 A | 8/2020 |

(Continued)

OTHER PUBLICATIONS

Sequans Communications, "Partial sensing for pedestrian UEs", R1-1611266, 3GPP TSG RAN WG1 Meeting #87, Reno, Nevada, Agenda Item 6.2.1.2.2, Nov. 14-18, 2016, 6 pages.

(Continued)

*Primary Examiner* — Bailor C Hsu
(74) *Attorney, Agent, or Firm* — Dorsey & Whitney LLP

(57) ABSTRACT

Systems and methods used by reduced sensing user equipment (UE) (relative to a full sensing UE) are disclosed herein. A UE performing partial sensing may use knowledge of resource reservation periods for a resource pool of one or more resources to reduce sensing as compared to the full sensing case. A UE performing resource re-evaluation and/or resource pre-emption may use one or more sensing windows that are relatively smaller than windows used in the full sensing case to reduce sensing. A UE performing prioritized resource selection may use a sensing window to (Continued)

determine availability of resources within a prioritized resource selection window with a high reliability, thereby reducing the need to spend power on other sensing methods (which may include full sensing methods). Combinations of these embodiments are also contemplated.

20 Claims, 19 Drawing Sheets

(51) Int. Cl.
*H04W 28/26* (2009.01)
*H04W 72/0446* (2023.01)
*H04W 72/563* (2023.01)

(56) References Cited

U.S. PATENT DOCUMENTS

| | | | |
|---|---|---|---|
| 2019/0313405 A1 | 10/2019 | Li et al. | |
| 2019/0386803 A1 | 12/2019 | Cai et al. | |
| 2020/0229205 A1* | 7/2020 | Bharadwaj | H04L 5/0053 |
| 2020/0235848 A1* | 7/2020 | Nguyen | H04L 1/0038 |
| 2020/0252910 A1* | 8/2020 | Wu | H04W 72/04 |
| 2020/0267729 A1* | 8/2020 | Kim | H04W 72/20 |
| 2021/0007081 A1* | 1/2021 | Shin | H04W 72/535 |
| 2021/0051525 A1* | 2/2021 | Cao | H04W 28/26 |
| 2021/0105104 A1* | 4/2021 | Cao | H04L 1/1896 |
| 2021/0307022 A1* | 9/2021 | Nguyen | H04W 72/542 |
| 2022/0116917 A1* | 4/2022 | Zhao | H04W 72/20 |
| 2022/0124561 A1* | 4/2022 | Wu | H04W 72/0446 |
| 2022/0400527 A1* | 12/2022 | Yoon | H04W 74/0808 |
| 2024/0031997 A1* | 1/2024 | Lin | H04W 4/40 |

FOREIGN PATENT DOCUMENTS

| | | |
|---|---|---|
| WO | 2020024175 A1 | 2/2020 |
| WO | 2020159329 A1 | 8/2020 |

OTHER PUBLICATIONS

Huawei, Hisilicon, "Evaluation results for P-UE partial sensing", R1-1611136, 3GPP TSG RAN WG1 Meeting #87, Reno, Nevada, Agenda Item 6.2.1.2.2, Nov. 14-18, 2016, 7 pages.

NTT Docomo, Inc., "Discussion on sidelink resource allocation for power saving", R1-2009193, 3GPP TSG RAN WG1 #103, e-Meeting, Agenda Item 8.11.2.1, Oct. 26-Nov. 13, 2020, 10 pages.

PCT/CN2021/071860, International Search Report and Written Opinion, Oct. 11, 2021, 9 pages.

CMCC, "Discussion on SA2 LS and solutions for slice-based cell reselection", R2-2010367, 3GPP TSG-RAN WG2 Meeting #112 electronic, Online, Agenda 8.8.2, Nov. 2-13, 2020, 6 pages.

Intel Corporation, "Sidelink Resource Allocation Mode-2 Design for NR V2X Communication", R1-1906796, 3GPP TSG RAN WG1 Meeting #97, Reno, Nevada, Agenda 8.11.2.1, May 13-17, 2019, 18 pages.

NEC, "Discussion on resource allocation for power saving", R1-2008950, 3GPP TSG RAN WG1 #103-e, e-Meeting, Agenda Item 8.11.2.1, Oct. 26 -Nov. 13, 2020, 6 pages.

* cited by examiner

POWER SAVING SENSING FOR REDUCED SENSING UES USING PARTIAL SENSING AND ADDITIONAL SENSING WITH A PRIORITIZED RESOURCE SELECTION WINDOW

TECHNICAL FIELD

This application relates generally to wireless communication systems, including systems and methods used by reduced sensing user equipment (UE).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Systems and methods for performing resource selection at a user equipment (UE) of a wireless communication system for (SL) transmissions with reduced power use for or as a result of a sensing aspect of such selection are disclosed herein. In some instances, SL resource selection at the UE involves a sensing of one or more resources of a resource pool configured for SL use at the UE. This sensing may give the UE some idea of, for example, which resources may have already been selected and/or reserved by other UEs of the wireless communication system, allowing the UE to make its own resource selections more appropriately based on this information.

Because such sensing requires an expenditure of power at the UE, there is value in developing methods of performing such sensing in a reduced manner that is power-efficient. Further, methods of performing such reduced sensing may account for the reliability needs on SL and/or the latency requirements for the SL use case.

Figure 1:
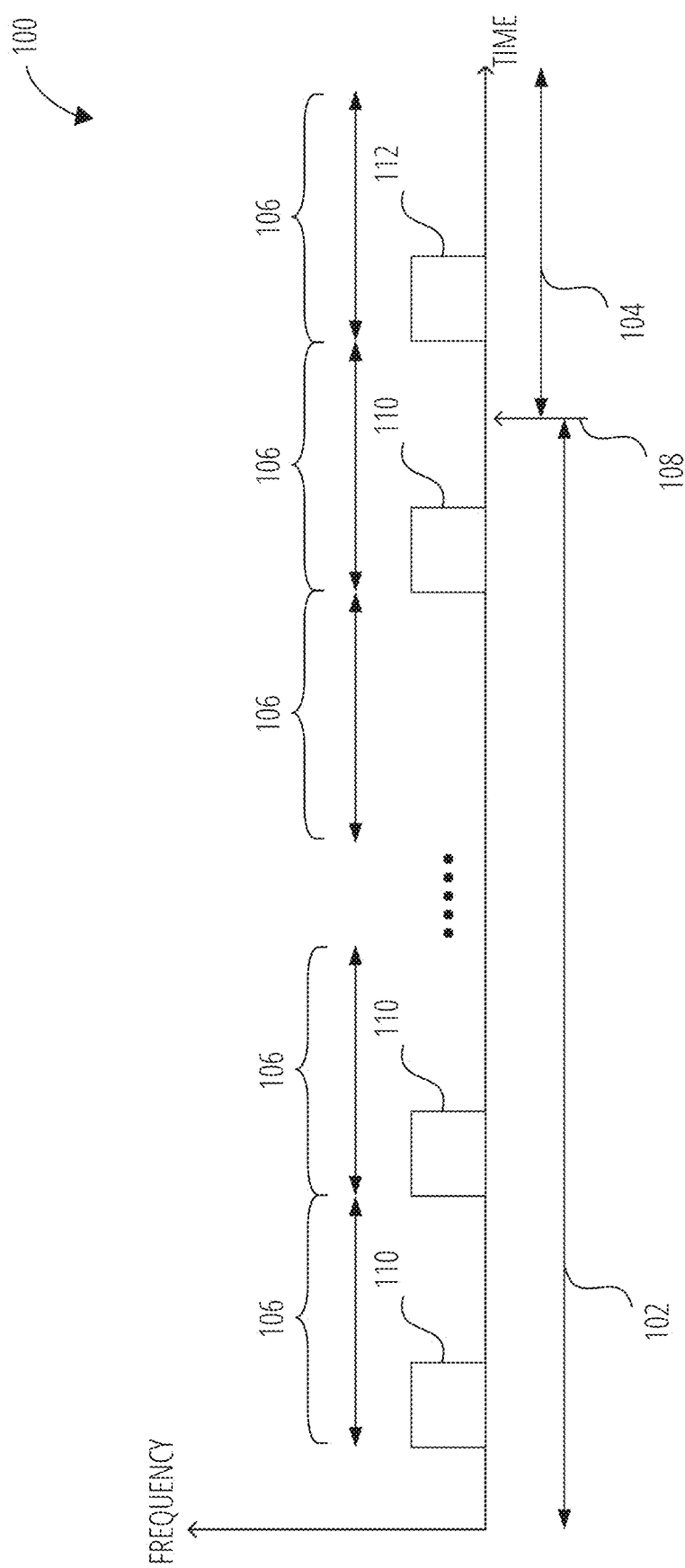
FIG. 1 illustrates a timeline for performing partial sensing for sidelink (SL), according to an embodiment.

FIG. 1 illustrates a timeline 100 for performing partial sensing for SL, according to an embodiment. The partial sensing of FIG. 1 may correspond to, for example, a partial sensing method that may be performed according to LTE.

The timeline 100 includes a detection window 102 and a resource selection window 104. The system may use a resource reservation period 106 that is arranged to be used by a UE for the reservation of a subframe in the future that is some multiple number of the resource reservation period 106 away. In the example of FIG. 1, the detection occasions 110 may correspond to reservations by UEs of the (future) subframes Y according to the resource reservation period 106.

A UE may then select a number of (future) subframes Y from resource selection window 104 for which to perform sensing (in this sense, the subframes Y are thus candidates for selection). The selection of subframes Y may be triggered by the resource selection trigger 108, which may correspond to the time at which data is ready be transmitted on SL. The number of subframes Y is upper bounded by the size of the resource selection window 104, but in a partial sensing scheme may be understood to be less than the extent of the resource selection window 104. For example, in a partial sensing scheme, the number of subframes Y may be located within the selection instance 112. Note also that the number of subframes Y may be lower bounded according to system configuration. The use of less than the entire resource selection window 104 for the selection instance 112 may use less power versus a UE that uses a selection instance 112 that spans the entire resource selection window 104.

Accordingly, subframes from the one or more detection occasions 110 of the detection window 102 that so correspond to each of the subframes Y of the selection instance 112 are understood by the system to be available for reservation purposes for such subframes Y (according to the resource reservation period 106 as described above). Note also that in some configurations, the wireless communication system is configured to allow for some instances of the resource reservation period 106 to not include a detection occasion 110 (as illustrated).

Then, during the detection occasions 110 during the detection window 102, the UE has been (prior to the resource selection trigger 108) sensing for reservations of one or more of the subframes Y of the selection instance 112 during the detection occasions 110. Accordingly, at the time of the resource selection trigger 108, the UE may determine a set of subframes Y of the selection instance 112 that have not been previously reserved by another UE of the system during one of the detection occasions 110. These subframes may be selected for use for SL communication.

Figure 2:
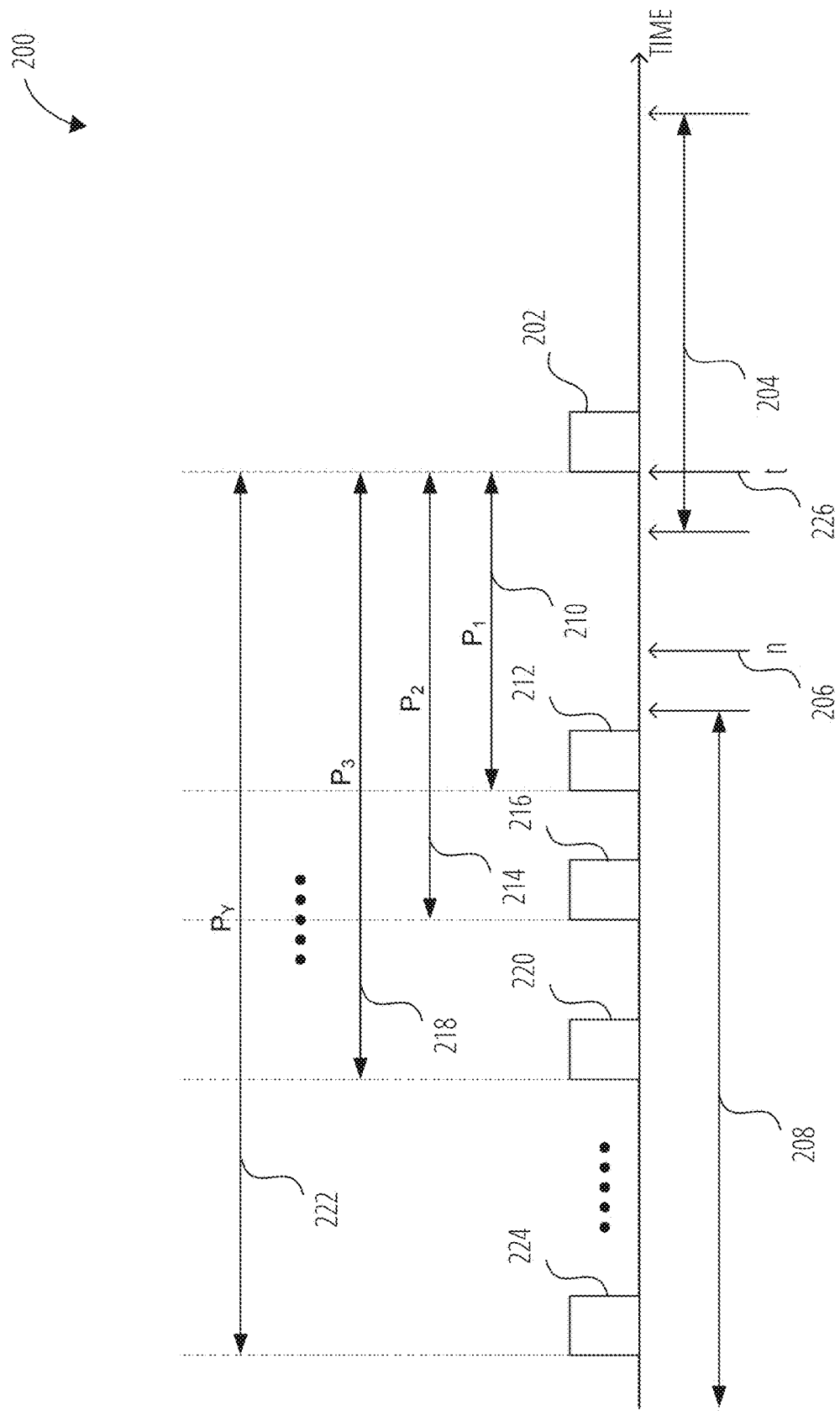
FIG. 2 illustrates a timeline of performing partial sensing for SL, according to an embodiment.

FIG. 2 illustrates a timeline 200 of performing partial sensing for SL, according to an embodiment. The partial sensing of FIG. 2 may correspond to, for example, a partial sensing method that may be performed according to NR. In NR, it may be that multiple different resource reservation periods (e.g., up to 16) having a variety of values (e.g., 1 milliseconds to 99 milliseconds) are useable simultaneously. Accordingly, it is beneficial to develop partial sensing method(s) that can anticipate and use these multiple resource reservation periods. It is contemplated that the partial sensing method of FIG. 2 may be applicable (as a non-limiting example) to NR Vehicle-to-Everything (V2X) use cases.

In FIG. 2, the selection of one or more resources of a candidate slot 202 during the resource selection window 204 may be the desired outcome. Similarly to FIG. 1, a resource selection trigger 206 occurs (e.g., at a time that data has become ready to be sent on SL, denoted n), and resources from a candidate slot 202 of the resource selection window 204 (which occurs after the resource selection trigger 206) may be selected based on sensing related to those resources that was performed prior to the resource selection window 204 during detection occasions of the detection window 208 that correspond to the candidate slot 202. The candidate slot 202 may extend less than the entire resource selection window 204, giving power savings versus, for example, methods instead configured to perform detection associated with all of the resources of the resource selection window 204.

However, differently from FIG. 1, and as illustrated in FIG. 2, it is contemplated that multiple different resource reservation periods may be used corresponding to the detection occasions for the candidate slot 202. For example, a resource pool from which the SL resources of the candidate slot 202 are to be selected may be configured to use a plurality of resource reservation periods $P=\{P_1 \ldots P_Y\}$ in a partial sensing method preparatory to resource selection from that resource pool, rather than using detection occasions according to a single resource reservation period (as in FIG. 1). A wireless communication system implementing a system according to FIG. 2 accordingly allows UEs to reserve resources within the candidate slot 202 during detection occasions corresponding to one or more of the configured resource reservation periods $\{P_1 \ldots P_Y\}$. In some such cases, the number of such resource reservation periods Y may be 16, but other values for Y are permissible.

Further, the values of any one such resource reservation period within P may vary. For example, as opposed to the (single) resource reservation period 106 of FIG. 1, it may be that each value of $\{P_1 \ldots P_Y\}$ may be (independently) selected from a range of values. In some cases, this range may be from 1 milliseconds to 99 milliseconds, which may correspond to NR V2X applications. Embodiments using other ranges (such as ranges of values greater than 100 milliseconds) are also contemplated.

In the example illustrated in FIG. 2, the various resource reservation periods P used include the first resource reservation period 210 (denoted $P_1$) corresponding to the first detection occasion 212, the second resource reservation period 214 (denoted $P_2$) corresponding to the second detection occasion 216, the third resource reservation period 218 (denoted $P_3$) corresponding to the third detection occasion 220. This pattern of resource reservation periods and associated detection occasions continues on (as indicated in FIG. 2) up until the y-th resource reservation period 222 (denoted $P_Y$) corresponding to the y-th detection occasion 224.

As illustrated, the candidate slot 202 begins at candidate slot time 226 (denoted t). Accordingly, the location of the illustrated detection occasions is determined based on their corresponding resource reservation periods as compared to the candidate slot time 226 of the candidate slot 202. For example, the first detection occasion 212 begins at a time t-$P_1$, the second detection occasion 216 begins at a time 1-$P_2$, the third detection occasion 220 begins at a time t-$P_3$, up on through the y-th detection occasion 224 that occurs at begins at a time t-Pr. Thus, when the resource selection trigger 206 occurs (at n) and prior to the beginning of the resource selection window 204, the UE has performed sensing at the first detection occasion 212, the second detection occasion 216, the third detection occasion 220, and on up through the y-th detection occasion 224 corresponding to the candidate slot 202 of the resource selection window 204. Accordingly, the UE will know which resources within the candidate slot 202 have been reserved by other UEs in the wireless communication system prior to the candidate slot time 226 of the candidate slot 202, and can makes its selection of resources from the candidate slot 202 accordingly.

The selected resources from the candidate slot 202 may then be used for SL transmission. In other cases, the selected resources may be used attendant to other methods (e.g., resource re-evaluation and/or resource pre-emption methods, and/or additional sensing methods, as will be discussed in more detail below).

Figure 3:
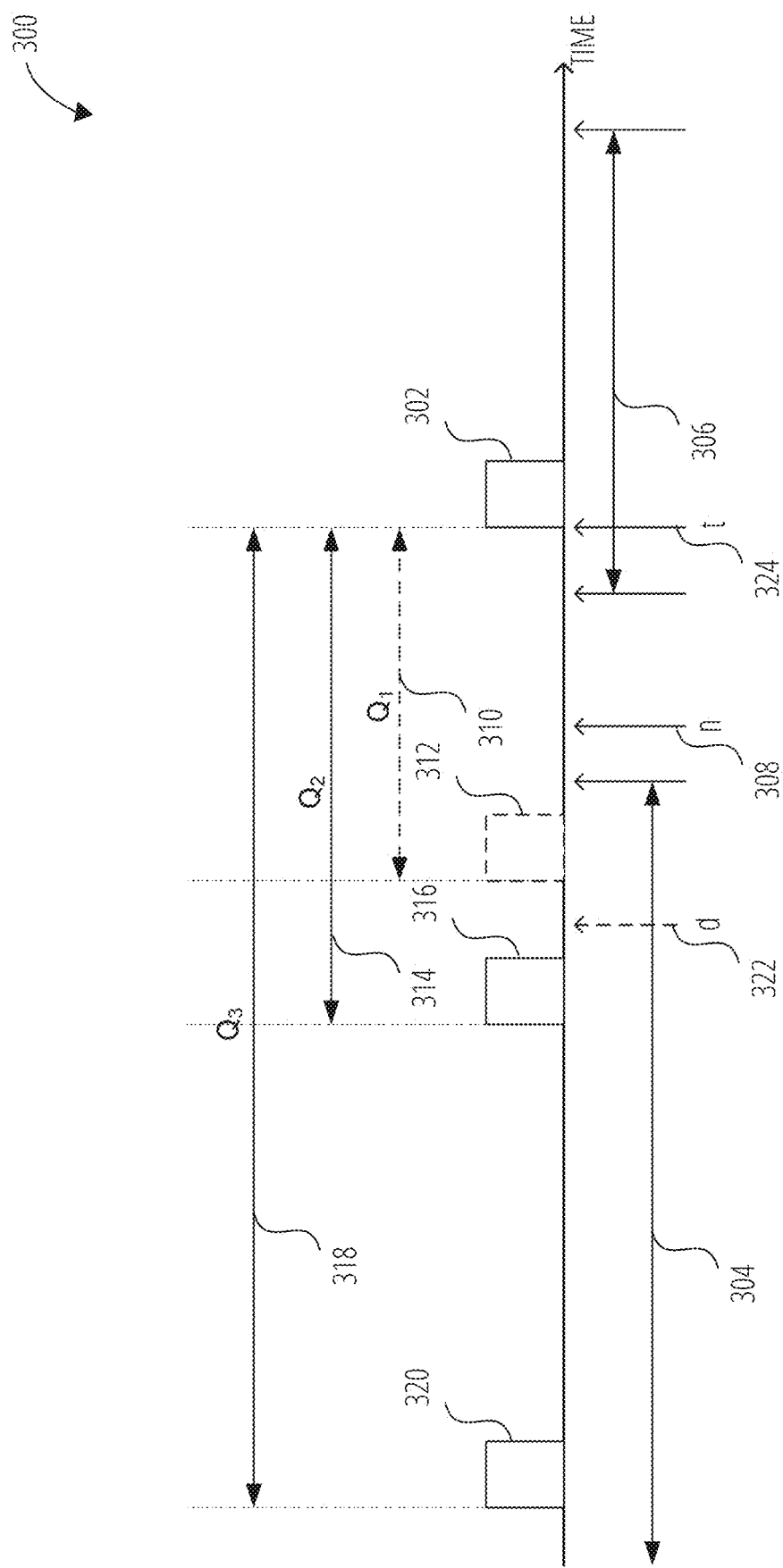
FIG. 3 illustrates a timeline of performing partial sensing for SL, according to an embodiment.

FIG. 3 illustrates a timeline 300 of performing partial sensing for SL, according to an embodiment. The embodiment of FIG. 3 illustrates the use of a subset Q={$Q_1 \ldots Q_X$} of the P={$P_1 \ldots P_Y$} that is described above. In other words, the embodiment of FIG. 3 may illustrate the use of some, but not all, of the resource reservation periods P described in FIG. 2. In FIG. 3, a candidate slot 302 from which resources are desired to transmit data on SL that caused the resource selection trigger 308 (denoted n) may occur at candidate slot time 324 (denoted t) within the resource selection window 306. FIG. 3 then illustrates how non-reserved resources of the candidate slot 302 are identified using sensing during the detection window 304 at detection occasions corresponding to periods Q⊂P, with a first resource reservation period 310 (denoted $Q_1$) corresponding to a first detection occasion 312, a second resource reservation period 314 (denoted $Q_2$) corresponding to a second detection occasion 316, and a third resource reservation period 318 (denoted $Q_3$) corresponding to a third detection occasion 320. It may be that the methods described in relation to P of FIG. 2 above are performable corresponding to FIG. 3 with Q. It may be that UEs competing for the use of resources from the candidate slot 302 may be configured to use the same Q.

The selection of which of P={$P_1 \ldots P_Y$} to use in Q={$Q_1 \ldots Q_X$} may be made in various ways. In some embodiments, the selection of which of P are included in Q may be made respective to a resource pool.

In other embodiments, the selection of which of P to include in Q is made depending on whether additional sensing is allowed after the resource selection trigger 308. As will be described in additional detail below, in embodiments using additional sensing, it may be that the data for transmission on SL is identified at an additional sensing data identification time 322 (denoted d) that is prior to the resource selection trigger 308, and additional sensing occurs in the space between the additional sensing data identification time 322 and the resource selection trigger 308. In cases where additional sensing is allowed after the partial sensing, Q may be chosen to include periodicities values from P that are greater than or equal to the duration of the additional sensing window occurring right after the additional sensing data identification time 322 during such additional sensing process. This may be because the additional sensing window may sense at times between the additional sensing data identification time 322 and the candidate slot time 324 of the candidate slot 302 for theoretical detection occasions corresponding to values from P smaller than the duration of the additional sensing window. This may mean that, as a counterexample using FIG. 2 with the additional sensing data identification time 322, $Q_1$ is not actually included in the set of Q (and note that the first resource reservation period 310 and the first detection occasion 312 have been illustrated as dotted in FIG. 3 to illustrate this case).

In some embodiments, the selection of which of P to include in Q is made depending on the priority of the data that is to be sent on the SL. For example, data with a high priority may use a set of Q from P that is higher in cardinality than a set Q' from P used for data with a low priority (e.g., the set Q may include more resource reservation periods from P than the set Q'). In some such cases, Q' may be a subset of Q.

In some embodiments, the selection of which of P to include in Q is made depending on a UE power level. For example, a UE with a medium (or higher) power level may use a set of Q from P that is higher in cardinality than a set Q' from P used by a UE with a low power level (e.g., the set Q may include more resource reservation periods than the set Q'). In some such cases, Q' may be a subset of Q.

In some embodiments, the selection of which of P to include in Q is made depending on a UE capability (e.g., that is set at the time of a manufacture of the UE, which in some cases may correspond to a size of a battery of the UE). For example, a UE with a medium (or higher) capability may use a set of Q from P that is higher in cardinality than a set Q' from P used by a UE with a low capability (e.g., the set Q may include more resource reservation periods than the set Q'). In some such cases, Q' may be a subset of Q.

The selected resources from the candidate slot 302 may then be used for SL transmission. In other cases, the selected resources may be used attendant to other methods (e.g., resource re-evaluation and/or resource pre-emption methods, and/or additional sensing methods, as will be discussed in more detail below).

Figure 4:
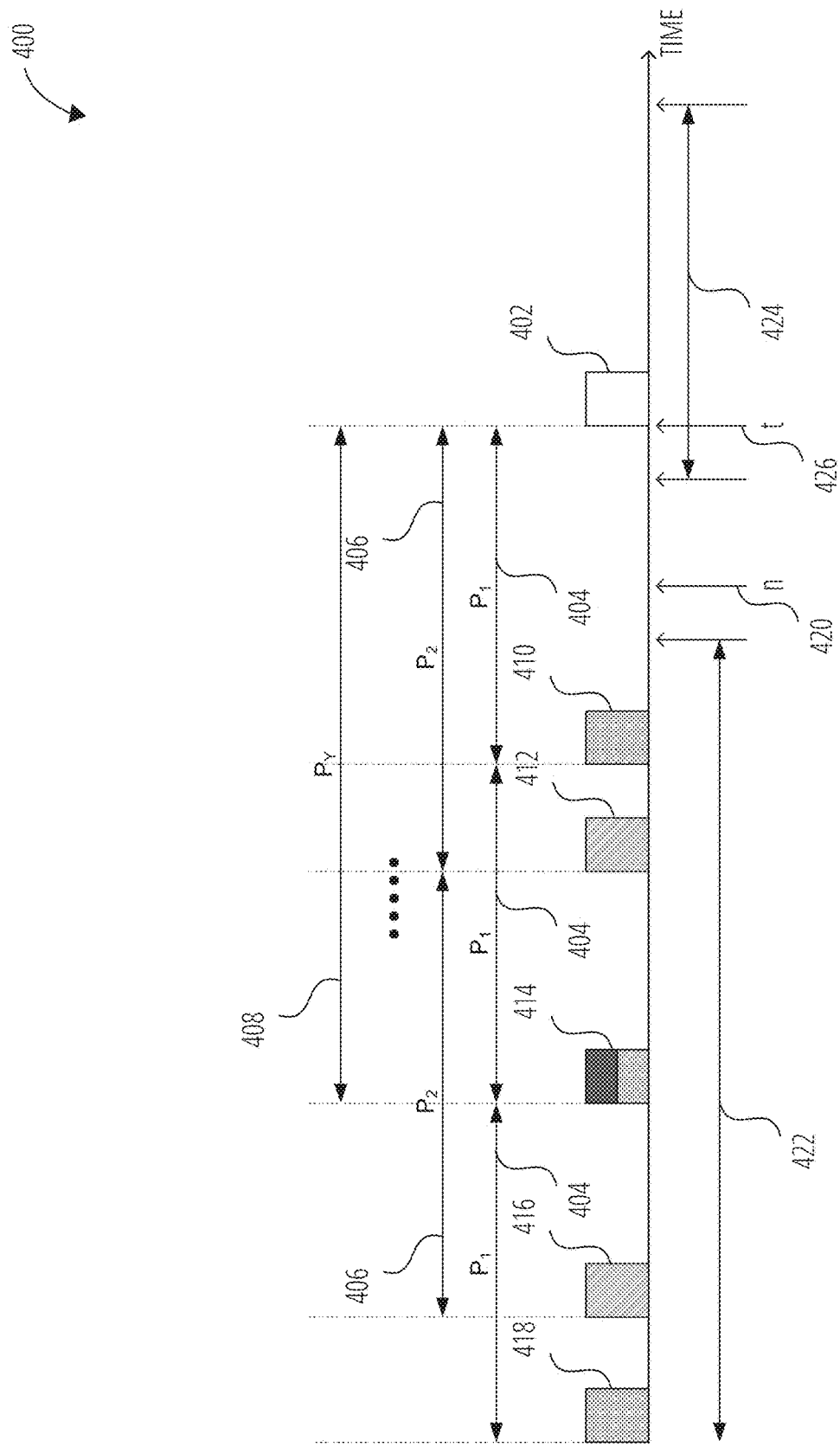
FIG. 4 illustrates a timeline of performing partial sensing for SL, according to an embodiment.

FIG. 4 illustrates a timeline 400 of performing partial sensing for SL, according to an embodiment. The embodiment of FIG. 4 illustrates uses of a plurality of detection occasions occurring according to the same resource reservation period. In FIG. 4, a candidate slot 402 from which resources are desired to transmit data on SL that caused the resource selection trigger 420 (denoted n) may occur at candidate slot time 426 (denoted t) within the resource selection window 424. FIG. 4 then illustrates how non-reserved resources of the candidate slot 402 are identified using sensing during the detection window 422 at detection occasions corresponding to resource reservation periods P. As illustrated, it may be that multiple detection occasions occurring according to a same resource reservation period in P may be used to detect whether a resource in the candidate slot 402 has been reserved. This may occur when a given resource reservation period is of a short enough length that multiple detection occasions N occurring according to that resource reservation period (measured back from candidate slot time 426 of the candidate slot 402) fall within the detection window 422.

For example, a first detection occasion 410, a third detection occasion 414, and a fifth detection occasion 418 within the detection window 422 may all correspond to a first resource reservation period 404 (N=3). Further, the second detection occasion 412 and the fourth detection occasion 416 within the detection window 422 may each correspond to a second resource reservation period 406 (N=2). Finally, the third detection occasion 414 within the detection window 422 may (also) correspond to a y-th resource reservation period 408 (N=1). Note that because the y-th resource reservation period 408 cannot be repeated backward without falling outside the detection window 422, there is only the detection occasion corresponding to the y-th resource reservation period 408.

Each of the first detection occasion 410, second detection occasion 412, third detection occasion 414, fourth detection occasion 416, and fifth detection occasion 418 may be used to sense for reservations from other UEs in the wireless communication system of resources within the candidate slot 402, and therefore the UE can determine (at least some of) the resources within the candidate slot 402 that have been reserved by the other UEs prior to the candidate slot time 426 of the candidate slot 402, allowing the UE to make its selection of resources from the candidate slot 402 accordingly.

The number of detection occasions N for a resource reservation period inP may have an upper limit according to the number of times the individual resource reservation period can be measured back from the candidate slot time 426 and still fall within the detection window 422, as described above.

Further, a maximum N for the number of detection occasions used for a resource reservation period in P may be configured or otherwise determined. For example, in some embodiments, the determination of the maximum N for a resource reservation period in P may be made respective to a configuration for such an N for a resource pool corresponding to the one or more resources of the candidate slot 402. In some embodiments, the determination for the maximum N for a resource reservation period in P is made depending on the priority of the data that is to be sent on the SL (with, e.g., a higher priority corresponding to a higher N). In some embodiments, the determination for the maximum N for a resource reservation period in P is made depending on a UE power level (with, e.g., a higher UE power level corresponding to a higher N). In some embodiments, the determination for the maximum N for a resource reservation period in P is made depending on a UE capability (with, e.g., a higher UE capability corresponding to a higher N).

It is further contemplated that in some embodiments, a same maximum N for the number of detection occasions may be used for each resource reservation period in P. In some cases, a lowest maximum N from among the resource reservation periods in P may be determined (using the criteria set above) and then applied for all of the resource reservation periods in P. This may ensure that all instances N of a resource reservation period in P fall within the detection window 422. This P-wide limitation on a maximum N may therefore result in fewer detection occasions to qualify a candidate slot as opposed to methods where each resource reservation period may use its own N.

It is also contemplated that methods using multiple detection occasions per resource reservation period as illustrated and described in relation to FIG. 4 may also be used in embodiments that use only a subset Q of the resource reservation periods P, with the subset Q being selected as described in relation to FIG. 3 above.

In some cases involving V2X, it may be that the partial sensing method of FIG. 2 through FIG. 4 is available when the detection window 208 is sufficiently large. In V2X cases, it may be that the partial sensing methods described in FIG. 2 through FIG. 4 are used when a sensing window is 1,100 milliseconds. This may anticipate the use of methods corresponding to FIG. 2 through FIG. 4 with V2X use cases where some periodic signals are sent/reserved every 1 second (1,000 milliseconds), thus guaranteeing that at least one detection occasion corresponding to a resource reservation period of up to 1,000 milliseconds is within the sensing window used. It is contemplated that embodiments that, for example, use periodic signals that are sent/reserved with a higher frequency (less than every 1,000 milliseconds) may allow for use of methods according to FIG. 2 through FIG. 4 in cases using a sensing window of less than 1,100 milliseconds.

The selected resources from the candidate slot 402 may then be used for SL transmission. In other cases, the selected resources may be used attendant to other methods (e.g., resource re-evaluation and/or resource pre-emption methods, and/or additional sensing methods, as will be discussed in more detail below).

Figure 5:
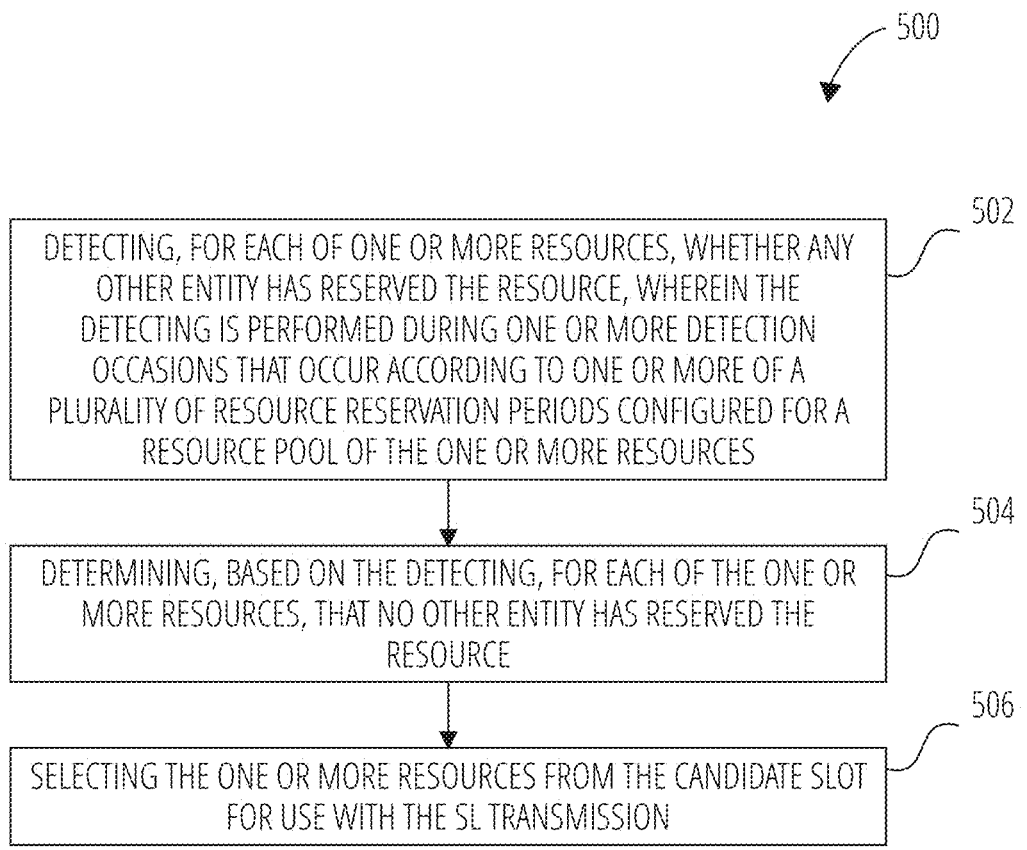
FIG. 5 illustrates a method of a user equipment (UE) for selecting one or more resources from a candidate slot to use to transmit data on a SL transmission, according to an embodiment.

FIG. 5 illustrates a method 500 of a UE for selecting one or more resources from a candidate slot to use to transmit data on a SL transmission, according to an embodiment. The method 500 may describe embodiments of partial sensing for SL.

The method 500 includes detecting 502, for each of one or more resources, whether any other entity has reserved the resource, wherein the detecting is performed during one or more detection occasions that occur according to one or more of a plurality of resource reservation periods configured for a resource pool of the one or more resources.

The method 500 further includes determining 504, based on the detecting, for each of the one or more resources, that no other entity has reserved the resource.

The method 500 further includes selecting 506 the one or more resources from the candidate slot for use with the SL transmission.

In some embodiments of the method 500, the candidate slot extends for less than an entire resource selection window.

In some embodiments of the method 500, the one or more of the plurality of the resource reservation periods for the one or more detection occasions is a subset of all resource reservation periods configured for the resource pool. In some such embodiments, the one or more of the plurality of resource reservation periods for the one or more detection occasions is determined based on whether additional sensing occurs between a resource selection trigger and the selecting the one or more resources from the candidate slot for use with the SL transmission. In some of these embodiments, the one or more of the plurality of resource reservation periods for the one or more detection occasions is determined based on a priority of the data. In some of these embodiments, the one or more of the plurality of resource reservation periods for the one or more detection occasions is determined based on a power level of the UE. In some of these embodiments, the one or more of the plurality of resource reservation periods for the one or more detection occasions is determined based on a UE capability.

In some embodiments of the method 500, the one or more detection occasions comprises a plurality of detection occasions that occur according to the same resource reservation period of the number of resource reservation periods. In some such embodiments, a number of the plurality of detection occasions that occur according to the same resource reservation period is pre-configured for the resource pool of the one or more resources. In some such embodiments, a number of the plurality of detection occasions that occur according to the same resource reservation period is determined based on a priority of the data. In some such embodiments, a number of the plurality of detection occasions that occur according to the same resource reservation period is determined based on a power level of the UE. In some such embodiments, a number of the plurality of detection occasions that occur according to the same resource reservation period is determined based on a UE capability.

Embodiments contemplated herein include an apparatus comprising means to perform one or more elements of the method 500. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, the memory 1606 of the UE 1600 described below, and/or the peripheral devices 1904, the memory/storage devices 1914, and/or the databases 1920 of the components 1900 as described below.

Embodiments contemplated herein include an apparatus comprising logic, modules, or circuitry to perform one or more elements of the method 500. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a UE 1600 as described below.

Embodiments contemplated herein include a signal as described in or related to one or more elements of the method 500.

Embodiments contemplated herein include a datagram, packet, frame, segment, protocol data unit (PDU), or message as described in or related to one or more elements of the method 500.

Embodiments contemplated herein include a signal encoded with data as described in or related to one or more elements of the method 500.

Embodiments contemplated herein include a signal encoded with a datagram, packet, frame, segment, PDU, or message as described in or related to one or more elements of the method 500.

Embodiments contemplated herein include an electromagnetic signal carrying computer-readable instructions, wherein execution of the computer-readable instructions by one or more processors is to cause the one or more processors to perform one or more elements of the method 500.

Embodiments contemplated herein include a computer program comprising instructions, wherein execution of the program by a processing element is to cause the processing element to carry out one or more elements of the method 500. These instructions may be, for example, the instructions processor 1908 and/or the instructions 1912 of the components 1900 as described below.

Figure 6:
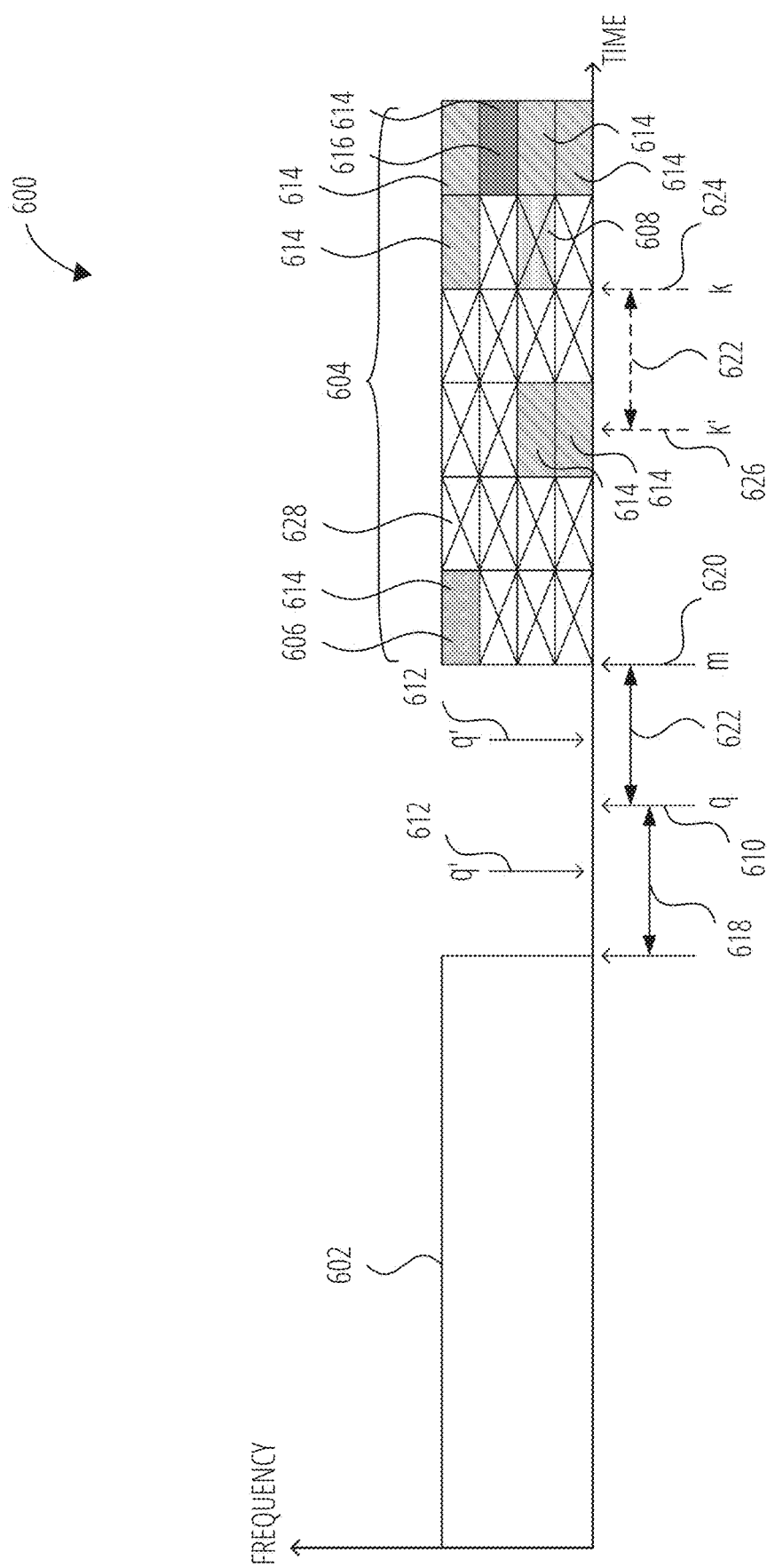
FIG. 6 illustrates a timeline of performing resource re-evaluation and/or resource pre-emption for SL, according to an embodiment.

FIG. 6 illustrates a timeline 600 of performing resource re-evaluation and/or resource pre-emption for SL, according to an embodiment. The timeline 600 may illustrate this process for a full sensing UE.

For resource re-evaluation and/or resource pre-emption processes, a UE may select one or more resources as part of a selected resource set. Sensing is then performed for the resources of the selected set in order to determine whether the resource should be used for SL communication, or whether one of resource pre-emption and/or resource re-evaluation will cause the resource to be replaced in the selected resource set by another resource. Resource re-evaluation and/or resource pre-emption may be used for, for example, determining whether certain resources are available for the transfer of sidelink control information (SCI) and sidelink data. The resources may be, for example, slots of one or more sub-channels.

FIG. 6 viewed one way, illustrates concepts related to resource re-evaluation. The timeline 600 includes a sensing window 602 and system SL resources 604. Depending on results of sensing that occurs during the sensing window 602, the UE will use one or more of the system SL resources 604 to perform SL communications.

FIG. 6 assumes that one or more resources may have already been selected to be part of the selected resource set. In FIG. 6, the first selected resource 606 and the second selected resource 608 of the system SL resources 604 have been originally selected as part of a selected resource set. Then, during the sensing window 602, the UE monitors whether any other UEs reserve any of the system SL resources 604 (including the first selected resource 606 and the second selected resource 608) within the system SL resources 604, prior to the UE's resource re-evaluation triggers (e.g., the mandatory resource re-evaluation trigger 610 (denoted q) and the zero or more optional resource re-evaluation triggers 612 (denoted q')). During this process, the UE may note already reserved resources as excluded resources 628, as illustrated (note that while only one excluded resource 628 is marked, this designation may apply to all resources illustrated with an "x" through them in FIG. 6).

At (at least) the time of a mandatory resource re-evaluation trigger 610, the UE determines, based on the information collected about other UE reservations collected during the sensing window 602, for each of its selected resources, whether the selected resource has already been reserved by another UE. In the example of FIG. 6, UE has identified a set of candidate resources 614 corresponding to the resources of the system SL resources 604 that were not detected as reserved during the sensing window 602 (and note that the first selected resource 606 and the re-selected resource 616 overlap with candidate resources 614 identified at this juncture). At this juncture, if the selected resource has not been reserved, the UE may determine that it may be used. For example, in FIG. 6, the UE has determined the first selected resource 606 overlaps with a candidate resource 614. Accordingly, the UE determines that no other UE has reserved the first selected resource 606 and further determines, in response, to use the first selected resource 606 for SL communications. On the other hand, if the selected resource has already been reserved, in at least some cases, the UE may determine to re-select from that resource to a new resource (causing the new resource to replace the re-selected-from resource in the selected resource set). In the example of FIG. 6, the UE has determined that the second selected resource 608 has already been reserved by another UE. In this case, the UE has re-selected from the second selected resource 608 to the re-selected resource 616 (and the re-selected resource 616 replaces the second selected resource 608 in the set of selected resources).

In some cases (not illustrated), a further priority check may be used prior to re-selection from the second selected resource 608. In such cases, the UE may instead determine that it (and/or the SL data it is preparing to send) has a higher priority than the peer UE that has reserved the second selected resource 608 (and/or the SL data corresponding to that reservation by the peer UE). In these cases, the UE may elect not to re-select from the second selected resource 608 and may instead proceed to use and/or reserve the second selected resource 608, in the manner that will be described, despite the peer UE's previous reservation of the second selected resource 608. In such cases, if the UE (and/or the SL data it is preparing to send) instead has a lower priority than the peer UE that has reserved the second selected resource 608 (and/or the SL data corresponding to that reservation by the peer UE), the UE may instead proceed to re-select from the second selected resource 608 in the manner described.

While the sensing that is useable for resource re-evaluation purposes may be the illustrated sensing window 602 that occurs prior to the time of the mandatory resource re-evaluation trigger 610 by a sensing processing duration 618 (e.g., a time for which it takes the UE to process sensing results), note that a full sensing UE may continue sensing after this time for, for example, resources occurring sometime after the illustrated system SL resources 604.

The mandatory resource re-evaluation trigger 610 occurs prior to a reservation trigger 620 (denoted m) by a re-selection processing duration 622. The re-selection processing duration 622 may be a time for which it takes a full sensing UE to determine whether to make resource re-selections based on the sensing performed during the sensing window 602. It is contemplated that in some cases, the re-selection processing duration 622 may be defined by a standard such that UEs from various sources can be configured to meet (or beat) this time.

In some instances, a UE may be capable of performing additional resource re-evaluation(s) at one or more additional, optional resource re-evaluation triggers 612. As illustrated, these optional resource re-evaluation triggers 612 may occur prior to and/or after a mandatory resource re-evaluation trigger 610. An optional resource re-evaluation trigger 612 occurring prior to the mandatory resource re-evaluation trigger 610 may allow the UE additional processing time to react to at least a portion of sensing data corresponding to the sensing window 602 that is already processed by that time. An optional resource re-evaluation trigger 612 occurring after the mandatory resource re-evaluation trigger 610 may be able to leverage an effectively longer sensing window 602 and therefore provide even more up-to-date results (and UEs using such an optional resource re-evaluation trigger 612 may have special processing characteristics that may allow them to process this data faster than the re-selection processing duration 622). In some embodiments, a UE using an optional resource re-evaluation trigger 612 occurring after the mandatory resource re-evaluation trigger 610 that newly detects that a selected resource is not available in the candidate resource 614 may not be required to perform re-selection of that resource (e.g., according to a standard).

At the reservation trigger 620, the UE may reserve one or more of the resources of the set of selected resources by sending a reservation signal indicating the reservation of the one or more of the resources of the set of selected resources. For example, in the example of FIG. 6, the UE may send a reservation signal reserving one or more of the first selected resource 606 and the re-selected resource 616. This may inform other peer UEs (e.g., that are performing methods similar to those described here in relation to FIG. 6) of the UE's reservation of those resources. The time of the reservation trigger 620 may be the time of the first-in-time selected resource of the set of selected resources (as determined prior to any reselection of that first-in-time selected resource). This resource reservation signal may be sent in SCI.

The UE may then perform SL communications using one or more of the resources of the set of selected resources. The resources so used may include one or more of the resources of the set of selected resources that was reserved in the manner described above.

FIG. 6, viewed in a second manner, also illustrates concepts related to resource pre-emption. Under this view, suppose that the second selected resource 608 was instead determined not to have been reserved by another peer UE (e.g., the second selected resource 608 was also a candidate resource 614). Accordingly, the UE does not re-select from the second selected resource 608 and sends a reservation signal at the reservation trigger 620 reserving the second selected resource 608. However, at some time after the reservation trigger 620 and prior to a preemption check resource time 624 (corresponding to the time of the second selected resource 608, denoted k), the UE performs a preemption check 626 (denoted k'). This preemption check 626 may be a further check to ensure that another peer UE is not signaling a reservation of the second selected resource 608, which circumstance may occur in spite of the UE's previous reservation of the reservation trigger 620 when, e.g., the peer UE has a higher priority than the UE, or when the peer UE has data of a high priority than the data of the UE, in the manner described above.

As in cases such as these, the UE may then reselect from the second selected resource 608 to the re-selected resource 616 in response to the peer UE's pre-emption of the second selected resource 608. As illustrated, the UE's preemption check 626 may occur prior to the preemption check resource time 624 by at least the re-selection processing duration 622 (so that the UE has time to perform such a re-selection prior to the preemption check resource time 624).

While illustrated separately, it is contemplated that resource re-evaluation and resource pre-emption are not exclusive as to a single set of system SL resources (such as the system SL resources 604). For example, it is contemplated that some UEs may perform resource re-selection for, for example, a first resource due to resource re-evaluation and for a second resource (including a previously re-selected-to resource) due to resource pre-emption (as described in relation to FIG. 6) in a single instance relating to a set of system SL resources.

Figure 7:
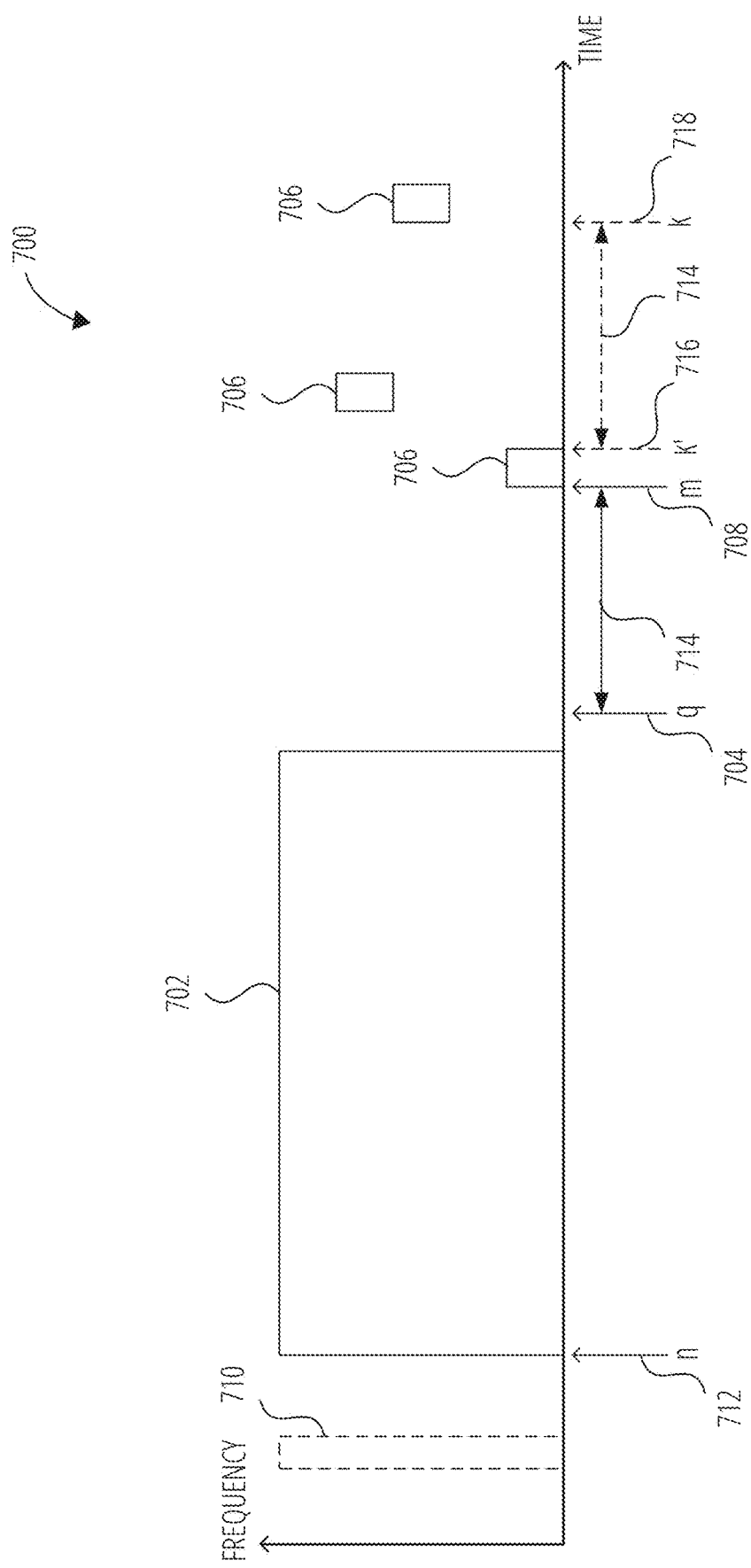
FIG. 7 illustrates a timeline of performing resource re-evaluation and/or resource pre-emption for SL, according to an embodiment.

FIG. 7 illustrates a timeline 700 of performing resource re-evaluation and/or resource pre-emption for SL, according to an embodiment. The timeline 700 may illustrate this process for a reduced sensing UE.

For example, the timeline 700 may include a sensing window 702 that ends at or before (e.g., ends by) the time of a resource re-evaluation trigger 704 (denoted q). As illustrated, in some embodiments, the sensing window 702 may end before the resource re-evaluation trigger 704, in order to give the UE a sensing processing duration to process the sensing window 702 (as was described in relation to the sensing processing duration 618 of FIG. 6). Information gathered from the sensing window 702 may be used at the resource re-evaluation trigger 704 to perform resource reselection, along the lines of the manner described above in relation to FIG. 6. Further, resource pre-emption may also occur along the lines of the manner described above in relation to FIG. 6. After such resource re-evaluation and/or resource pre-emption, the UE determines to include the selected resources 706 in the set of selected resources. Then, at a reservation trigger 708 (denoted m), the UE may reserve one or more of the selected resources 706 and/or begin transmitting on any one of the selected resource 706 that aligns with the reservation trigger 708, along the lines of the manner described above in relation to FIG. 6.

Various differences reflected in the timeline 700 as compared to the discussion of FIG. 6 will now be discussed.

The timeline 700 includes an optional use of preliminary sensing 710, and further includes a resource selection trigger 712 (denoted n). This preliminary sensing 710 may be used by the UE to perform an initial selection of resources to initially include in a set of selected resources described in relation to FIG. 6 (note that this initial selection was assumed in FIG. 6). For example, the preliminary sensing 710 may be a partial sensing method similar to those discussed in relation to FIG. 1 through FIG. 5, the result of which may comprise the initially selected resources that are then potentially re-selected from and/or pre-empted in the manner described herein.

A resource selection trigger 712 may be the time of an initial determination of a set of selected resource (prior to resource re-evaluation and/or resource pre-emption potentially applying to one or more such resources). The resource selection trigger 712 may be, for example, an identification of data to be sent on the SL. The initial determination of the set of selected may be based on, e.g., preliminary sensing such as the preliminary sensing 710. In other embodiments, the initial determination of the set of selected resource may be random/arbitrary.

As illustrated, in some embodiments, a UE may not begin using a sensing window such as the sensing window 702 until the time of the resource selection trigger 712. By deferring the use of the sensing window 702 until the resource selection trigger 712, power savings at the UE may be achieved over the method of FIG. 6 (which may describe a full sensing UE with, e.g., a continuously active sensing window 602).

The timeline 700 of FIG. 7 includes a re-selection processing duration 714. This re-selection processing duration 714 may be used to determine whether to use a resource or to make resource re-selections based on the sensing performed during the sensing window 702, analogously to the re-selection processing duration 622 described in relation to FIG. 6. However, in the embodiment of FIG. 7, the re-selection processing duration 714 may be a time that is longer than the re-selection processing duration 622. In other words, the re-selection processing duration 714 may be an amount of time that is greater than a processing time for a full sensing UE to determine, for each of the selected resources of the set of selected resources, whether to re-select from the selected resource. Accordingly, the re-selection processing duration 714 may be an amount of time that is greater than, for example, a re-selection processing duration 622 that is defined by a standard such that UEs from various sources can be configured to meet (or beat) the re-selection processing duration 622. The re-selection processing duration 714 may be determined based on a resource pool corresponding to the selected resources 706 (said resource pool including any initially determined resources that were not re-selected at the resource re-evaluation trigger 704 and any re-selected to resources at the resource re-evaluation trigger 704, in the manner described above), based on a cast type (e.g., unicast, multicast, broadcast) of the SL communication, and/or may be pre-configured to the UE.

This relatively longer re-selection processing duration 714 may reduce the size of the sensing window 702 relative to the sensing window 602 of FIG. 6 (e.g., through the UE ending the use of the sensing window 702 earlier in order to allow temporal space for the larger re-selection processing duration 714 prior to the reservation trigger 708). The relatively smaller sensing window 702 may thus use less power than the sensing window 602 of FIG. 6 due to this reduced active duration. Further, the greater re-selection processing duration 714 allows the UE to use less power when determining whether and re-selections need to be performed. For example, a processor of the UE can use a slower speed (corresponding to a more efficient power use) to determine whether re-selections of resources in the set of selected resources need to be performed, due to the additional time available for processing during the re-selection processing duration 714 as compared to the re-selection processing duration 622 of FIG. 6.

The use of the longer re-selection processing duration 714 may also allow power savings relative to a resource pre-emption scheme that is analogous to that described in relation to FIG. 6 above, but that uses the longer re-selection processing duration 714 instead of the re-selection processing duration 622 for preemption checking purposes (and thus allows the processor to use a slower but more efficient power setting when performing the pre-emption checking for one or more resources of a set of selected resources). Accordingly, a pre-emption check for a resource of the set of selected resource may be performed at a time equal to a time of the resource minus the (relatively longer) re-selection processing duration 714. This is illustrated in FIG. 7 by the preemption check 716 (denoted k') occurring prior to the preemption check resource time 718 (denoted k) by an amount of time equal to the re-selection processing duration 714.

Figure 8:
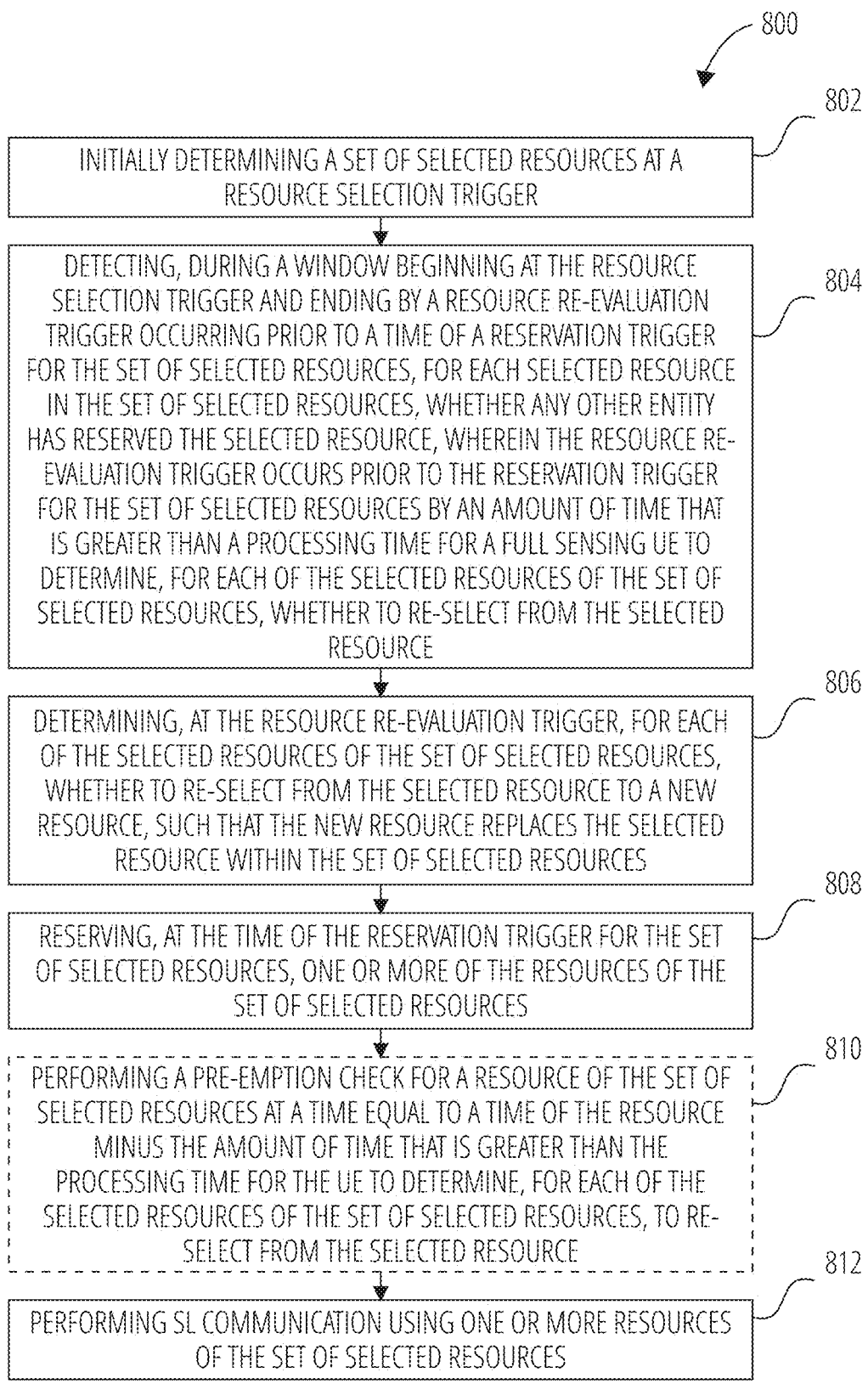
FIG. 8 illustrates a method of a reduced sensing UE for SL communication, according to an embodiment.

FIG. 8 illustrates a method 800 of a reduced sensing UE for SL communication, according to an embodiment. The method 800 may illustrate this process for a reduced sensing UE performing resource re-evaluation and/or resource pre-emption for SL.

The method 800 includes initially determining 802 a set of selected resources at a resource selection trigger.

The method 800 further includes detecting 804, during a window beginning at the resource selection trigger and ending by a resource re-evaluation trigger occurring prior to a reservation trigger for the set of selected resources, for each selected resource in the set of selected resources, whether any other entity has reserved the selected resource, wherein the resource re-evaluation trigger occurs prior to the reservation trigger for the set of selected resources by an amount of time that is greater than a processing time for a full sensing UE to determine, for each of the selected resources of the set of selected resources, whether to re-select from the selected resource.

The method 800 further includes determining 806, at the resource re-evaluation trigger, for each of the selected resources of the set of selected resources, whether to re-select from the selected resource to a new resource, such that the new resource replaces the selected resource within the set of selected resources.

The method 800 further includes reserving 808, at the time of the reservation trigger for the set of selected resources, one or more of the resources of the set of selected resources.

The method 800 further optionally includes performing 810 a pre-emption check for a resource of the set of selected resources at a time equal to a time of the resource minus the amount of time that is greater than the processing time for the UE to determine, for each of the selected resources of the set of selected resources, to re-select from the selected resource.

The method 800 further includes performing 812 SL communication using one or more resources of the set of selected resources.

In some embodiments of the method 800, the amount of time that is greater than the processing time for the UE to determine, for each of the selected resources of the set of selected resources, whether to re-select from the selected resource is determined based on a resource pool corresponding to the selected resources of the set.

In some embodiments of the method 800, the amount of time that is greater than the processing time for the UE to determine, for each of the selected resources of the set of selected resources, whether to re-select from the selected resource is determined based on a cast type of the SL communication.

In some embodiments of the method 800, the amount of time that is greater than the processing time for the UE to determine, for each of the selected resources of the set of selected resources, whether to re-select from the selected resource is preconfigured to the UE.

In some embodiments of the method 800, each of the selected resources of the set of selected resources is a slot of a sub-channel.

In some embodiments of the method 800, the initially determining the set of selected resources is performed using a partial sensing method.

In some embodiments of the method 800, for a resource of the selected resources of the set of selected resources, the UE determines to re-select from the selected resource to a new resource based on detecting, during the window, that another entity has reserved the selected resource.

In some embodiments of the method 800, for a resource of the selected resources of the set of selected resources, the UE detects that another entity has reserved the selected resource, and the determining whether to re-select to a new resource is further based on a relative priority between the UE and the other entity.

Embodiments contemplated herein include an apparatus comprising means to perform one or more elements of the method 800. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, the memory 1606 of the UE 1600 described below, and/or the peripheral devices 1904, the memory/storage devices 1914, and/or the databases 1920 of the components 1900 as described below.

Embodiments contemplated herein include an apparatus comprising logic, modules, or circuitry to perform one or more elements of the method 800. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a UE 1600 as described below.

Embodiments contemplated herein include a signal as described in or related to one or more elements of the method 800.

Embodiments contemplated herein include a datagram, packet, frame, segment, protocol data unit (PDU), or message as described in or related to one or more elements of the method 800.

Embodiments contemplated herein include a signal encoded with data as described in or related to one or more elements of the method 800.

Embodiments contemplated herein include a signal encoded with a datagram, packet, frame, segment, PDU, or message as described in or related to one or more elements of the method 800.

Embodiments contemplated herein include an electromagnetic signal carrying computer-readable instructions, wherein execution of the computer-readable instructions by one or more processors is to cause the one or more processors to perform one or more elements of the method 800.

Embodiments contemplated herein include a computer program comprising instructions, wherein execution of the program by a processing element is to cause the processing element to carry out one or more elements of the method 800. These instructions may be, for example, the instructions processor 1908 and/or the instructions 1912 of the components 1900 as described below.

Figure 9:
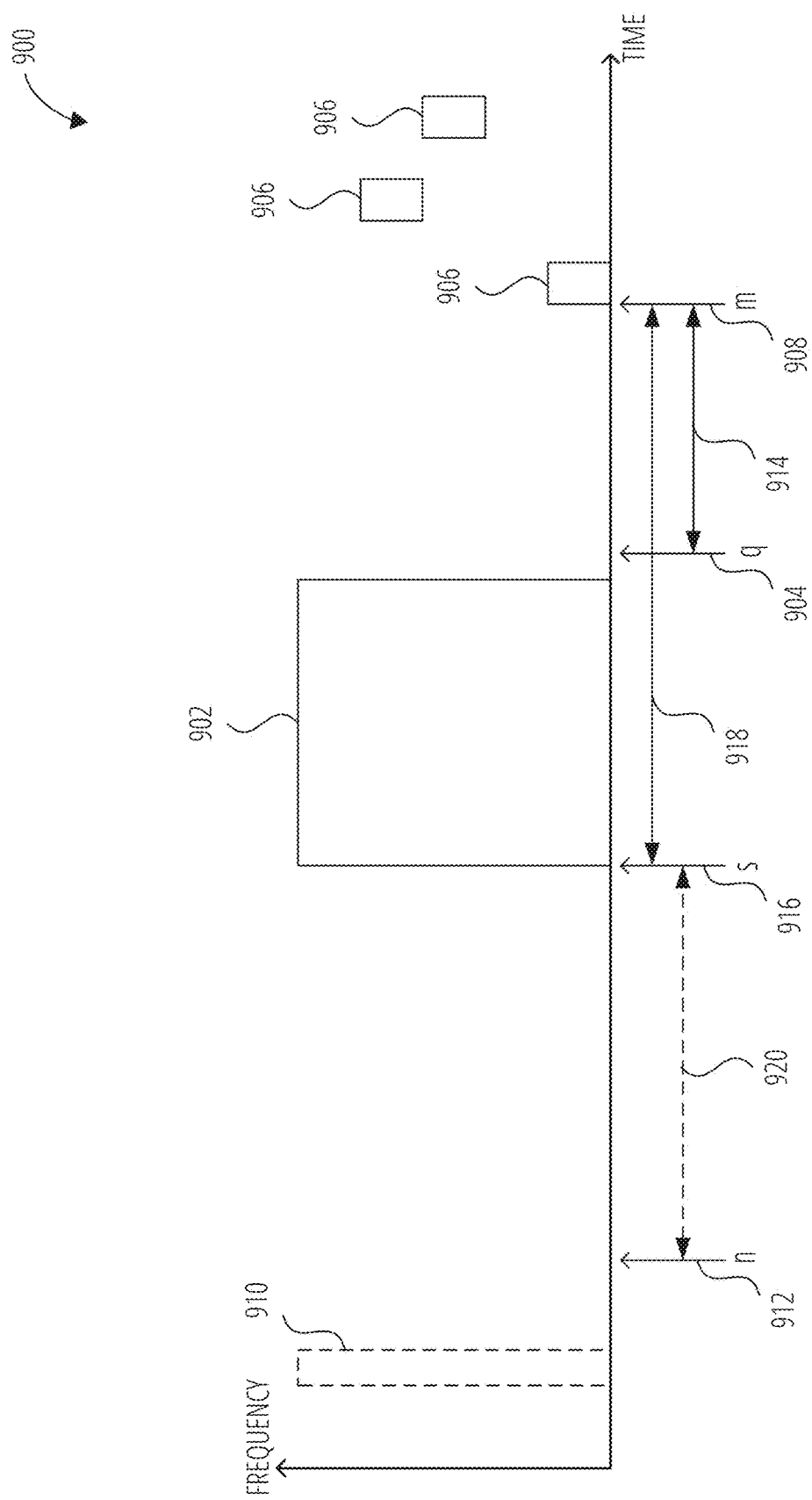
FIG. 9 illustrates a timeline of performing resource re-evaluation and/or resource pre-emption for SL, according to an embodiment.

FIG. 9 illustrates a timeline 900 of performing resource re-evaluation and/or resource pre-emption for SL, according to an embodiment. The timeline 900 may illustrate this process for a reduced sensing UE.

For example, the timeline 900 may include a sensing window 902 that ends at or before (e.g., ends by) the time of a resource re-evaluation trigger 904 (denoted q). As illustrated, in some embodiments, the sensing window 902 may end before the resource re-evaluation trigger 904, in order to give the UE a sensing processing duration to process the sensing window 902 (as was described in relation to the sensing processing duration 618 of FIG. 6). Information gathered from the sensing window 902 may be used at the resource re-evaluation trigger 904 to perform resource reselection using a re-selection processing duration 914, along the lines of the manner described above in relation to FIG. 6. Further, resource pre-emption may also occur along the lines of the manner described above in relation to FIG. 6. After such resource re-evaluation and/or resource pre-emption, the UE determines to include the selected resources 906 in the set of selected resources. Then, at a reservation trigger 908 (denoted m), the UE may reserve one or more of the selected resources 906 and/or begin transmitting on any one of the selected resource 906 that aligns with the reservation trigger 908, along the lines of the manner described above in relation to FIG. 6.

Various differences reflected in the timeline 900 as compared to the discussion of FIG. 6 will now be discussed.

The timeline 900 includes an optional use of preliminary sensing 910, and further includes a resource selection trigger 912 (denoted n). These may be similar in function and application to the preliminary sensing 710 and the resource selection trigger 712 described above in relation to FIG. 7.

Further, the timeline 900 illustrates that the sensing window 902 may have a sensing window start time 916 (denoted s) that occurs sometime after the resource selection trigger 912. In other words, the sensing window 902 may begin a non-zero duration after the resource selection trigger 912. This delay in performing the sensing operations attendant to the sensing window 902 may result in a sensing window 902 that is of a shorter overall duration than sensing windows previously described. As there is a shorter duration during which the UE is actively performing sensing during the sensing window 902, corresponding power savings may be achieved.

The sensing window start time 916 may be determined by the UE relative to the reservation trigger 908 using a sensing window offset duration 918 measured from the reservation trigger 908. Accordingly, a larger sensing window offset duration 918 results in a larger sensing window 902 and a smaller sensing window offset duration 918 results in a smaller sensing window 902.

In alternative embodiments, it may be that the alternate sensing window offset duration 920, measured from the resource selection trigger 912, may be instead used to set the sensing window start time 916. Accordingly, a larger alternate sensing window offset duration 920 results in a smaller sensing window 902 and a smaller alternate sensing window offset duration 920 results in a larger sensing window 902.

The sensing window offset duration 918 or the alternate sensing window offset duration 920 (depending on which one is used), and thus a time of the beginning of the sensing window 902, may be selected and/or adjusted by various circumstances. In some embodiments, the sensing window offset duration 918/the alternate sensing window offset duration 920 is pre-configured to the UE (and thus the time of the beginning of the sensing window 902 is based on a UE pre-configuration). In some embodiments, the sensing window offset duration 918/the alternate sensing window offset duration 920 is a pre-configured value for the resource pool of the selected resources 906 (said resource pool including any initially determined resources that were not re-selected at the resource re-evaluation trigger 904 and any re-selected to resources at the resource re-evaluation trigger 904, in the manner described above). Thus, the time of the beginning of the sensing window 902 is determined based on the resource pool corresponding to the selected resources.

In some embodiments, the sensing window offset duration 918/alternate sensing window offset duration 920 may depend on the power capability of the UE (thus the time of the beginning of the sensing window 902 is based on the power capability of the UE). For example, a UE with a relatively higher power capability may use a relatively larger sensing window offset duration 918/relatively smaller alternate sensing window offset duration 920. In some embodiments, the sensing window offset duration 918/alternate sensing window offset duration 920 may depend on the power status of the UE (thus the time of the beginning of the sensing window 902 is based on the power status of the UE). For example, a UE with a high power status may use a larger sensing window offset duration 918/smaller alternate sensing window offset duration 920 than a UE with a lower power status. In some embodiments, the sensing window offset duration 918/alternate sensing window offset duration 920 may depend on the cast type of the data to be sent on the selected resources 906 (and thus the time of the beginning of the sensing window 902 is determined based on one of a cast type of the SL communication). For example, the sensing window offset duration 918 may be larger/the alternate sensing window offset duration 920 may be smaller for groupcast/multicast data than in the case of unicast data. In some embodiments, the sensing window offset duration 918/alternate sensing window offset duration 920 may depend on the priority of the data to be sent on the selected resources 906 (and thus the time of the beginning of the sensing window 902 is determined based on the priority of such data). For example, the sensing window offset duration 918 may increase/the alternate sensing window offset duration 920 may decrease with an increase of the priority of the data to be sent, in order to be more certain that the resources selected are clear for use with the high priority data.

Corresponding to the relatively shorter duration of sensing window 902, the UE may acquire less sensing data than embodiments using relatively longer sensing windows. Accordingly, in some embodiments, it may be that the embodiment illustrated by the timeline 900 of FIG. 9 is used in cases where it can be determined that a shorter, more precise sensing window 902 can be used with high utility. For example, in some cases corresponding to the timeline 900, the sensing window 902 may be used in cases where aperiodic reservations within the wireless communication system are desired to be monitored. In some such wireless communication systems, the aperiodic reservation window used by the system may itself have a period of a certain size (e.g., 32 slots). Accordingly, the value of the sensing window offset duration 918/alternate sensing window offset duration 920 may be selected such that the sensing window 902 has a duration of that same certain size (e.g., 32 slots), in order to capture a full data set corresponding to one period of an aperiodic reservation window within the wireless communication system, without catching more (and thus the time of the beginning of the sensing window 902 is determined based on the periodicity of the aperiodic reservation window).

In alternative embodiments, the sensing window offset duration 918 is itself up to 32 slots (or the alternate sensing window offset duration 920, if used instead of the sensing window offset duration 918, is selected such that the duration between the sensing window start time 916 and the reservation trigger 908 is up to 32 slots). This may correspond to a smaller sensing window 902 than in the previous case, which may then allow for further precision as to only a portion of the 32 slot period in the sensing window 902 in the previous case to target.

Figure 10:
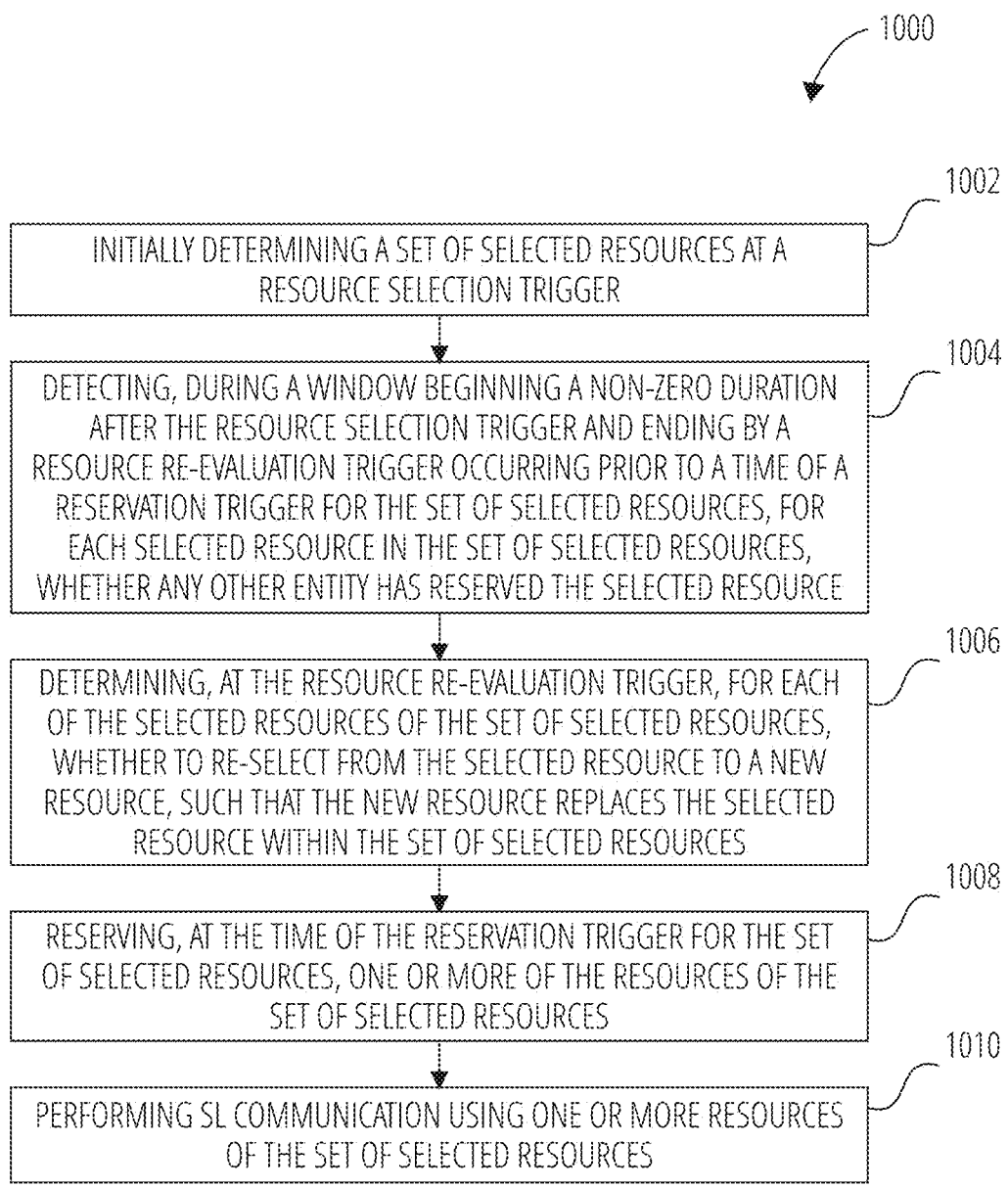
FIG. 10 illustrates a method of a reduced sensing UE for SL communication, according to an embodiment.

FIG. 10 illustrates a method 1000 of a reduced sensing UE for SL communication, according to an embodiment. The method 1000 may illustrate this process for a reduced sensing UE performing resource re-evaluation and/or resource pre-emption for SL.

The method 1000 includes initially determining 1002 a set of selected resources at a resource selection trigger.

The method 1000 further includes detecting 1004, during a window beginning a non-zero duration after the resource selection trigger and ending by a resource re-evaluation trigger occurring prior to a time of a reservation trigger for the set of selected resources, for each selected resource in the set of selected resources, whether any other entity has reserved the selected resource.

The method 1000 further includes determining 1006, at the resource re-evaluation trigger, for each of the selected resources of the set of selected resources, whether to re-select from the selected resource to a new resource, such that the new resource replaces the selected resource within the set of selected resources.

The method 1000 further includes reserving 1008, at the time of the reservation trigger for the set of selected resources, one or more of the resources of the set of selected resources.

The method 1000 further includes performing 1010 SL communication using one or more resources of the set of selected resources.

In some embodiments of the method 1000, a time of the beginning of the window used to perform the detecting is determined based on a UE pre-configuration.

In some embodiments of the method 1000, a time of the beginning of the window used to perform the detecting is determined based on a resource pool corresponding to the selected resources of the set of selected resources.

In some embodiments of the method 1000, a time of the beginning of the window used to perform the detecting is determined based on a power capability of the UE.

In some embodiments of the method 1000, a time of the beginning of the window used to perform the detecting is determined based on a power status of the UE.

In some embodiments of the method 1000, a time of the beginning of the window used to perform the detecting is determined based on a cast type of the SL communication.

In some embodiments of the method 1000, a time of the beginning of the window used to perform the detecting is determined based on a priority of data to be sent in the SL communication.

In some embodiments of the method 1000, a time of the beginning of the window used to perform the detecting is determined based on a periodicity of an aperiodic reservation window.

In some embodiments of the method 1000, for a resource of the selected resources of the set of selected resources, the UE determines to re-select from the selected resource to a new resource based on detecting, during the window, that another entity has reserved the selected resource.

In some embodiments of the method 1000, for a resource of the selected resources of the set of selected resources, the UE detects that another entity has reserved the selected resource, and the determining whether to re-select to new resource is further based on a relative priority between the UE and the other entity.

Embodiments contemplated herein include an apparatus comprising means to perform one or more elements of the method 1000. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 1000. This non-transitory computer-readable media may be, for example, the memory 1606 of the UE 1600 described below, and/or the peripheral devices 1904, the memory/storage devices 1914, and/or the databases 1920 of the components 1900 as described below.

Embodiments contemplated herein include an apparatus comprising logic, modules, or circuitry to perform one or more elements of the method 1000. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 1000. This apparatus may be, for example, an apparatus of a UE 1600 as described below.

Embodiments contemplated herein include a signal as described in or related to one or more elements of the method 1000.

Embodiments contemplated herein include a datagram, packet, frame, segment, protocol data unit (PDU), or message as described in or related to one or more elements of the method 1000.

Embodiments contemplated herein include a signal encoded with data as described in or related to one or more elements of the method 1000.

Embodiments contemplated herein include a signal encoded with a datagram, packet, frame, segment, PDU, or message as described in or related to one or more elements of the method 1000.

Embodiments contemplated herein include an electromagnetic signal carrying computer-readable instructions, wherein execution of the computer-readable instructions by one or more processors is to cause the one or more processors to perform one or more elements of the method 1000.

Embodiments contemplated herein include a computer program comprising instructions, wherein execution of the program by a processing element is to cause the processing element to carry out one or more elements of the method 1000. These instructions may be, for example, the instructions processor 1908 and/or the instructions 1912 of the components 1900 as described below.

Figure 11:
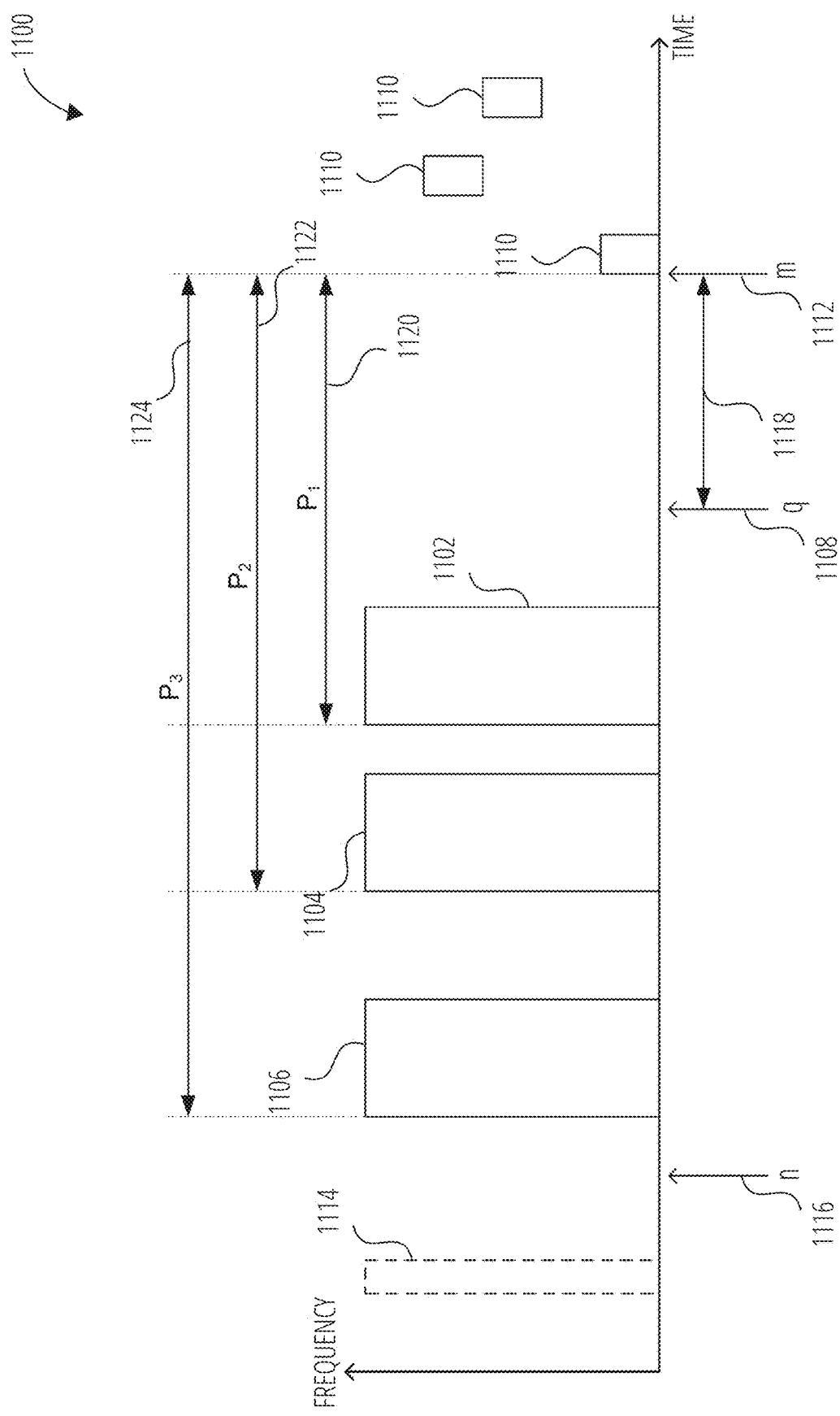
FIG. 11 illustrates a timeline of performing resource re-evaluation and/or resource pre-emption for SL, according to an embodiment.

FIG. 11 illustrates a timeline 1100 of performing resource re-evaluation and/or resource pre-emption for SL, according to an embodiment. The timeline 1100 may illustrate this process for a reduced sensing UE.

For example, the timeline 1100 may include one or more sensing windows (including the first sensing window 1102, the second sensing window 1104, and the third sensing window 1106) prior to a resource re-evaluation trigger 1108 (denoted q), and information gathered from these windows may be used at the resource re-evaluation trigger 1108 to perform resource reselection using a re-selection processing duration 1118, along the lines of the manner described above in relation to FIG. 6 (but which only used a single sensing window 602). Further, resource pre-emption may also occur along the lines of the manner described above in relation to FIG. 6. After such resource re-evaluation and/or resource pre-emption, the UE determines to include the selected resources 1110 in the set of selected resources. Then, at a reservation trigger 1112 (denoted m), the UE may reserve one or more of the selected resources 1110 and/or begin transmitting on any one of the selected resource 1110 that aligns with the reservation trigger 1112, along the lines of the manner described above in relation to FIG. 6.

Various differences reflected in the timeline 1100 compared to the discussion of FIG. 6 will now be discussed.

The timeline 1100 includes an optional use of preliminary sensing 1114, and further includes a resource selection trigger 1116 (denoted n). These may be similar in function and application to the preliminary sensing 710 and the resource selection trigger 712 described above in relation to FIG. 7.

Further, the timeline 900 illustrates the use of multiple sensing windows, including the first sensing window 1102, the second sensing window 1104, and the sensing windows 1106. The selected resources 1110 may be taken from/belong to a resource pool that is configured for reservation according to one or more resource reservation periods (said resource pool including any initially determined resources that were not re-selected at the resource re-evaluation trigger 1108 and any re-selected to resources at the resource re-evaluation trigger 1108, in the manner described above). For example, the selected resources 1110 (whether considered prior to any later re-selection activity by the UE, or afterward) may belong to a resource pool that is configured for a periodic reservation scheme according to one or more reservation periods measured back from the reservation trigger 1112 that occurs at the time of a first-in-time resource of the selected resources 1110 (as determined prior to any reselection of that first-in-time resource). In such circumstances, the periodic nature of such reservations according to (potentially multiple) resource reservation periods may be leveraged by the UE to determine locations on the timeline 1100 that a previous reservation of one or more of the selected resources 1110 according to the relevant periodicities may occur. This allows the UE to use a plurality of sensing windows at these locations that may be smaller (even when combined together) than sensing window(s) of other possible embodiments to determine whether another UE has reserved one or more resources of the set of selected resources 1110. This may reduce the amount of time that the UE spends actively sensing as compared to other possible embodiments, thereby resulting in power savings.

For example, in the timeline 1100, the first sensing window 1102 may correspond to a first resource reservation period 1120 of the resource pool of the selected resources 1110, the second sensing window 1104 may correspond to a second resource reservation period 1122 of the resource pool of the selected resources 1110, and the third sensing window 1106 may correspond to a third resource reservation period 1124 of the resource pool of the selected resource 1110. Each of these windows may occur prior to a time of the resource re-evaluation trigger 1108, a shown. The UE detects during these windows whether another UE has reserved one or more of the selected resources 1110 (e.g., when the selected resource 1110 are considered as the initially determined set of selected resources). The UE the proceeds, at the resource re-evaluation trigger 1108 to make re-evaluation determinations regarding the initial set of selected resources, in the manner described above.

Figure 12:
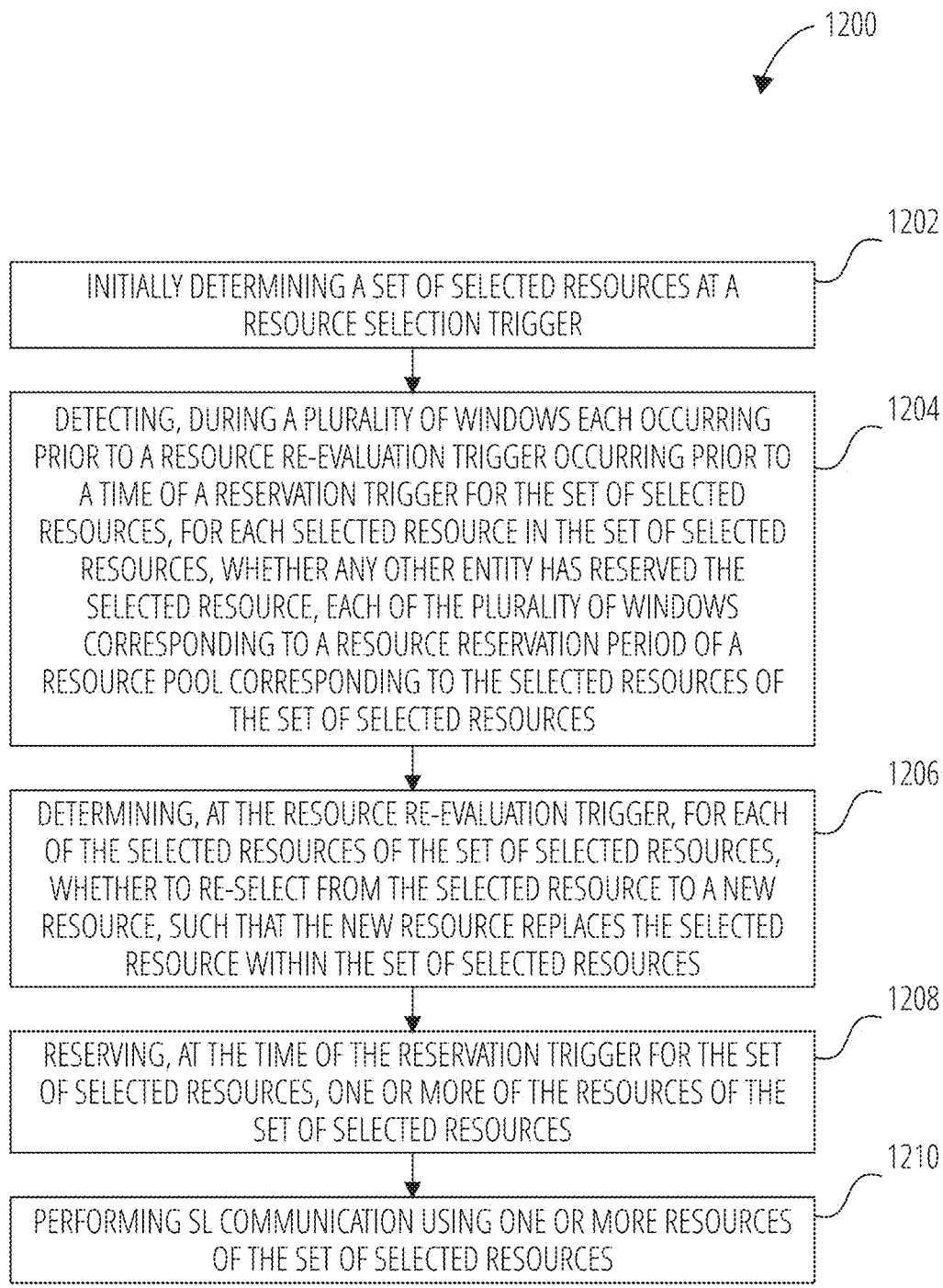
FIG. 12 illustrates a method of a reduced sensing UE for SL communication, according to an embodiment.

FIG. 12 illustrates a method 1200 of a reduced sensing UE for SL communication, according to an embodiment. The method 1200 may illustrate this process for a reduced sensing UE performing resource re-evaluation and/or resource pre-emption for SL.

The method 1200 includes initially determining 1202 a set of selected resources at a resource selection trigger.

The method 1200 further includes detecting 1204, during a plurality of windows each occurring prior to a resource re-evaluation trigger occurring prior to a reservation trigger for the set of selected resources, for each selected resource in the set of selected resources, whether any other entity has reserved the selected resource, each of the plurality of windows corresponding to a resource reservation period of a resource pool corresponding to the selected resources of the set of selected resources.

The method 1200 further includes determining 1206, at the resource re-evaluation trigger, for each of the selected resources of the set of selected resources, whether to re-select from the selected resource to a new resource, such that the new resource replaces the selected resource within the set of selected resources.

The method 1200 further includes reserving 1208, at the reservation trigger for the set of selected resources, one or more of the resources of the set of selected resources.

The method 1200 further includes performing 1210 SL communication using one or more resources of the set of selected resources.

In some embodiments of the method 1200, for a resource of the selected resources of the set of selected resources, the UE determines to re-select from the selected resource to a new resource based on detecting, during the plurality of windows, that another entity has reserved the selected resource.

In some embodiments of the method 1200, for a resource of the selected resources of the set of selected resources, the UE detects that another entity has reserved the selected resource, and the determining whether to reserve the selected resource or to re-select to a new resource is further based on a relative priority between the UE and the other entity.

In some embodiments of the method 1200, the initially determining the set of selected resources is performed using a partial sensing method.

Embodiments contemplated herein include an apparatus comprising means to perform one or more elements of the method 1200. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 1200. This non-transitory computer-readable media may be, for example, the memory 1606 of the UE 1600 described below, and/or the peripheral devices 1904, the memory/storage devices 1914, and/or the databases 1920 of the components 1900 as described below.

Embodiments contemplated herein include an apparatus comprising logic, modules, or circuitry to perform one or more elements of the method 1200. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 1200. This apparatus may be, for example, an apparatus of a UE 1600 as described below.

Embodiments contemplated herein include a signal as described in or related to one or more elements of the method 1200.

Embodiments contemplated herein include a datagram, packet, frame, segment, protocol data unit (PDU), or message as described in or related to one or more elements of the method 1200.

Embodiments contemplated herein include a signal encoded with data as described in or related to one or more elements of the method 1200.

Embodiments contemplated herein include a signal encoded with a datagram, packet, frame, segment, PDU, or message as described in or related to one or more elements of the method 1200.

Embodiments contemplated herein include an electromagnetic signal carrying computer-readable instructions, wherein execution of the computer-readable instructions by one or more processors is to cause the one or more processors to perform one or more elements of the method 1200.

Embodiments contemplated herein include a computer program comprising instructions, wherein execution of the program by a processing element is to cause the processing element to carry out one or more elements of the method 1200. These instructions may be, for example, the instructions processor 1908 and/or the instructions 1912 of the components 1900 as described below.

It is contemplated that a resource re-evaluation and/or resource pre-emption method used by a UE may use any combination of methods described in relation to FIG. 6 through FIG. 12. For example, A UE may simultaneously employ any combination of an increased re-selection processing duration (as in FIG. 7 and FIG. 8), a sensing window start time that occurs after a resource selection trigger (as in FIG. 9 and FIG. 10), and/or multiple sensing windows (as in FIG. 11 and FIG. 12).

Some embodiments for resource re-evaluation and/or resource pre-emption described above for reduced sensing have been discussed relative to a resource pool of selected resources. It is contemplated that a UE may employ such reduced sensing methods as to one or more of a plurality of resource pools. It is further contemplated that the UE may instead act as a full sensing UE as to one or more others of the plurality of resource pools (and that this use may occur alongside the reduced sensing use as to other resource pools). Further, divisions of individual resource pools into a plurality of frequency domains, with some frequency domains using reduced sensing and others using full sensing is also contemplated.

Figure 13:
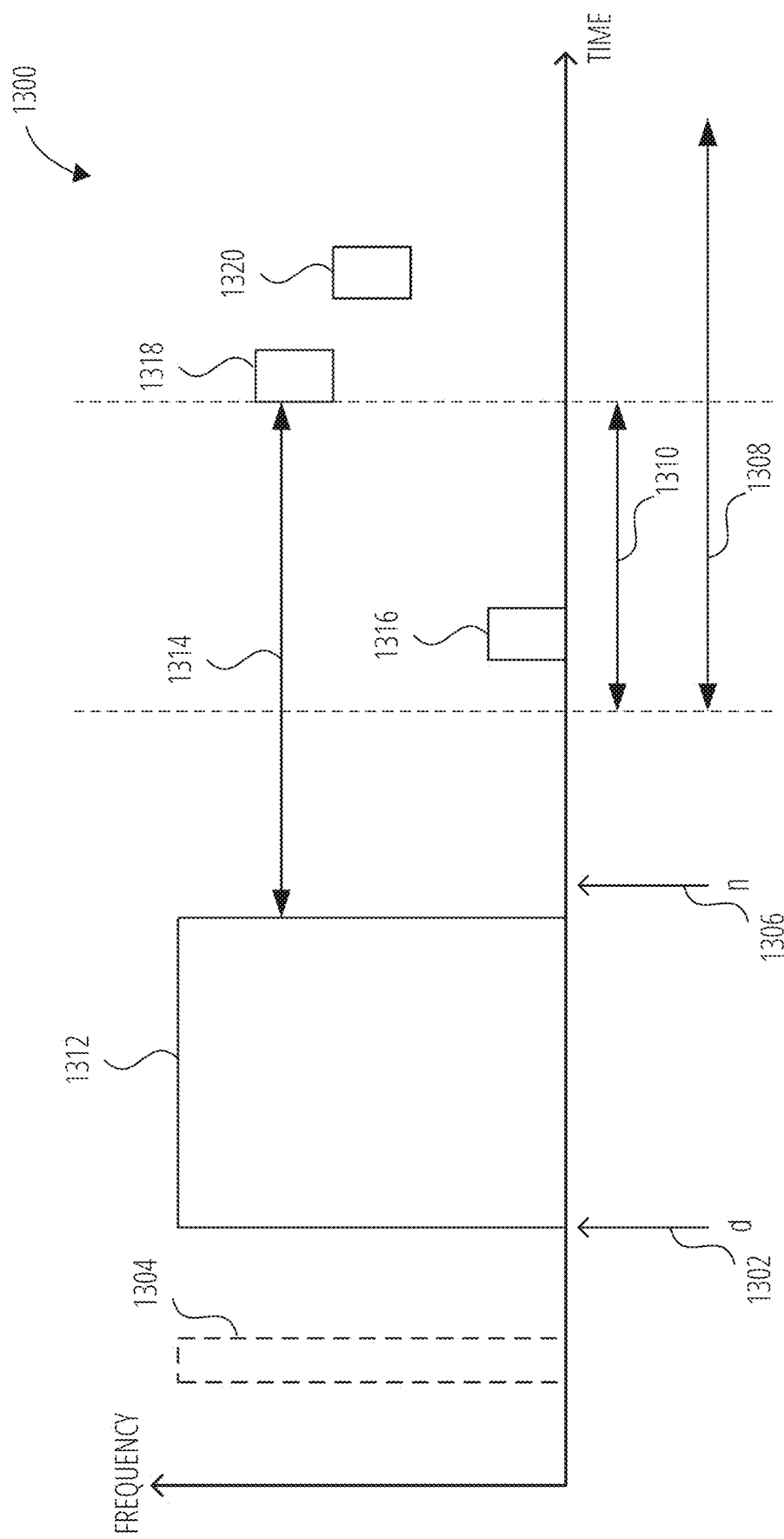
FIG. 13 illustrates a timeline of performing prioritized resource selection for SL, according to an embodiment.

FIG. 13 illustrates a timeline 1300 of performing prioritized resource selection for SL, according to an embodiment. The timeline 1300 may illustrate this process for a reduced sensing UE.

In prioritized resource selection embodiments, a UE may identify data to be sent on SL at a data identification time 1302 (denoted d). The UE may determine to send this data on one or more resources of an upcoming resource selection window 1308. The UE may then perform sensing (sometimes described herein as additional sensing) corresponding to at least some of the resources of the upcoming resource selection window 1308, prior to selecting such resources for use to send the SL data. This sensing may occur during an additional sensing window 1312. During the additional sensing window 1312, the UE may sense to determine whether another entity in the wireless communication system has reserved one or more upcoming resources of a resource selection window 1308 (that corresponds to an associated prioritized resource selection window 1310, in the manner described below).

After the additional sensing window 1312 ends, a resource selection trigger 1306 (denoted n) may occur at the UE, at which time the UE selects one or more resources of the resource selection window 1308 to perform the SL transmission.

The resource selection window 1308 may include the prioritized resource selection window 1310. This prioritized resource selection window 1310 may be the portion of the resource selection window 1308 that is within a resource reservation window duration 1314 from the end of the additional sensing window 1312, in the manner illustrated. In some embodiments, the resource reservation window duration 1314 may be, for example, a duration of 32 slots. The prioritized resource selection window 1310 may correspond to resources of a resource reservation window that is immediately subsequent to the one that was (perhaps only partly) sensed during the additional sensing window 1312. Accordingly, the UE may have a higher level of confidence that the resources of the prioritized resource selection window 1310 have not been reserved by another entity in the wireless communication system, as compared to the resources found in the remainder of the resource selection window 1308.

Then, at the resource selection trigger 1306, the UE may prioritize the selection of resources from the prioritized resource selection window 1310 for selection from all resources of the resource selection window 1308. Accordingly, the selection of the first resource 1316 may be based (at least in part) on the sensing that occurs during the additional sensing window 1312.

In one example, the UE prioritizes the selection of resources from the prioritized resource selection window 1310 by selecting resources from the prioritized resource selection window 1310 prior to any resources from the remainder of the resource selection window 1308. For example, the UE may select the first resource 1316 (which is in the prioritized resource selection window 1310) prior to any selection of, e.g., the second resource 1318 and/or the third resource 1320 (which are within the overall resource selection window 1308 but outside the prioritized resource selection window 1310).

In another example, the UE prioritizes the selection of resources from the prioritized resource selection window 1310 by selecting only resources from the prioritized resource selection window 1310 (and not selecting any resources from the remainder of the resource selection window 1308). For example, the UE may select only the first resource 1316 and not select the second resource 1318 and the third resource 1320.

In another example, the UE prioritizes the selection of resources from the prioritized resource selection window 1310 by selecting resources from the prioritized resource selection window 1310 with a higher probability than the selection of resources from the remainder of the resource selection window 1308. For example, the UE may select the first resource 1316 with a higher probability than a probability of selecting the second resource 1318 and/or the third resource 1320.

In another example, the UE prioritizes the selection of resources from the prioritized resource selection window 1310 by applying a higher initial Reference Signal Received Power (RSRP) exclusion threshold to resources from the prioritized resource selection window 1310 than to resources from the remainder of the resource selection window 1308.

It may be that a UE considers a resource as reserved by another UE by checking a reservation signal in SCI sent by one or more other UEs and determining whether the measured RSRP of that/those reservation signals is higher than the RSRP exclusion threshold. If the percentage of the resources that remain eligible for selection is below a certain level, then the RSRP exclusion threshold is increased (e.g., by 3 dB) and a new loop of resource exclusion is performed. The procedure loop may continue until the percentage of the resources eligible for selection is above the certain level.

Accordingly, in some embodiments corresponding to FIG. 13, the RSRP exclusion threshold for determining whether the first resource 1316 (which is in the prioritized resource selection window 1310) is eligible for selection from the one or more resources of the resource selection window 1308 may be higher than an RSRP exclusion threshold for determining whether the second resource 1318 and/or the third resource 1320 are eligible for selection from the one or more resources of the resource selection window 1308. In some embodiments, the higher RSRP exclusion threshold corresponding to resources from the prioritized resource selection window 1310 may be set according to a pre-configured step amount (e.g., 3 dB). In some embodiments, the higher RSRP exclusion threshold corresponding to resources from the prioritized resource selection window 1310 may comprise a maximum RSRP threshold. In this way, the UE is more likely to select resources of the prioritized resource selection window 1310.

The use of prioritized resource selection as described may eliminate or reduce the need for/duration of other sensing methods at the UE, due to a high reliability of information regarding at least resources within the prioritized resource selection window 1310 that is achieved. Accordingly, the power that would have been used on other methods (e.g., to perform sensing according to those methods) that are not otherwise performed can be saved.

The selection of each of the first resource 1316, the second resource 1318, and the third resource 1320 from the one or more resources of the resource selection window 1308 (as applicable in each embodiment discussed above) may (or in the case of the first resource 1316, may also), in some embodiments be based on preliminary sensing 1304 that may occur prior to the data identification time 1302. The preliminary sensing 1304 may be used by the UE to gather initial information about resource availability prior to a performance of the rest of the timeline 1300. For example, the preliminary sensing 1304 may be a partial sensing method similar to those discussed in relation to FIG. 1 through FIG. 5 that is used to initially determine which one or more resources of the resource selection window 1308 are available (selectable) for SL transmission, prior to the performance of any further portions of the timeline 1300.

Figure 14:
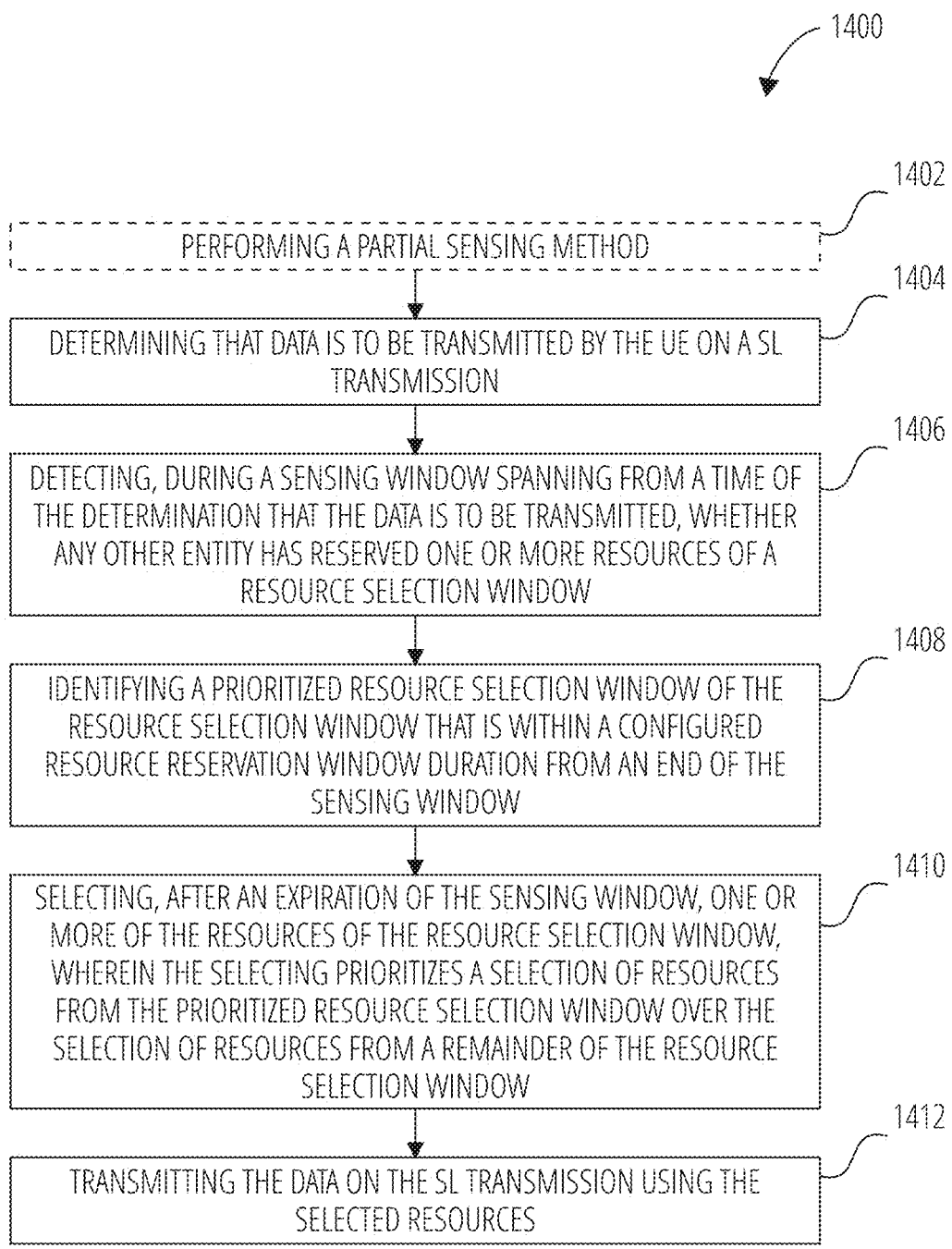
FIG. 14 illustrates a method of a UE operating in a reduced sensing mode for prioritized resource selection, according to an embodiment.

FIG. 14 illustrates a method 1400 of a UE operating in a reduced sensing mode for prioritized resource selection, according to an embodiment. The method 1400 may illustrate this process for a reduced sensing UE performing prioritized resource selection for SL.

The method 1400 optionally includes performing 1402 a partial sensing method.

The method 1400 further includes determining 1404 that data is to be transmitted by the UE on a SL transmission.

The method 1400 further includes detecting 1406, during a sensing window spanning from a time of the determination that the data is to be transmitted, whether any other entity has reserved one or more resources of a resource selection window.

The method 1400 further includes identifying 1408 a prioritized resource selection window of the resource selection window that is within a configured resource reservation window duration from an end of the sensing window.

The method 1400 further includes selecting 1410, after an expiration of the sensing window, one or more of the resources of the resource selection window, wherein the selecting prioritizes a selection of resources from the prioritized resource selection window over the selection of resources from a remainder of the resource selection window.

The method 1400 further includes transmitting 1412 the data on the SL transmission using the selected resources.

In some embodiments of the method 1400, the selecting prioritizes the selection of resources from the prioritized resource selection window by selecting only resources from the prioritized resource selection window.

In some embodiments of the method 1400, the selecting prioritizes the selection of resources from the prioritized resource selection window by selecting resources from the prioritized resource selection window with a higher probability than resources from the remainder of the resource selection window.

In some embodiments of the method 1400, the selecting prioritizes the selection of resources from the prioritized resource selection window by applying a higher initial Reference Signal Received Power (RSRP) exclusion threshold to resources from the prioritized resource selection window than to resources from the remainder of the resource selection window. In some such embodiments, the higher initial RSRP exclusion threshold is set according to a pre-configured step amount. In some such embodiments, the higher initial RSRP exclusion threshold comprises a maximum RSRP threshold.

In some embodiments of the method 1400 that include the performing 1402 of the partial sensing method, the selecting the one or more of the resources of the resource selection window further comprises the use of a result of the partial sensing method to determine selectable resources.

Embodiments contemplated herein include an apparatus comprising means to perform one or more elements of the method 1400. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 1400. This non-transitory computer-readable media may be, for example, the memory 1606 of the UE 1600 described below, and/or the peripheral devices 1904, the memory/storage devices 1914, and/or the databases 1920 of the components 1900 as described below.

Embodiments contemplated herein include an apparatus comprising logic, modules, or circuitry to perform one or more elements of the method 1400. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 1400. This apparatus may be, for example, an apparatus of a UE 1600 as described below.

Embodiments contemplated herein include a signal as described in or related to one or more elements of the method 1400.

Embodiments contemplated herein include a datagram, packet, frame, segment, protocol data unit (PDU), or message as described in or related to one or more elements of the method 1400.

Embodiments contemplated herein include a signal encoded with data as described in or related to one or more elements of the method 1400.

Embodiments contemplated herein include a signal encoded with a datagram, packet, frame, segment, PDU, or message as described in or related to one or more elements of the method 1400.

Embodiments contemplated herein include an electromagnetic signal carrying computer-readable instructions, wherein execution of the computer-readable instructions by one or more processors is to cause the one or more processors to perform one or more elements of the method 1400.

Embodiments contemplated herein include a computer program comprising instructions, wherein execution of the program by a processing element is to cause the processing element to carry out one or more elements of the method 1400. These instructions may be, for example, the instructions processor 1908 and/or the instructions 1912 of the components 1900 as described below.

According to embodiments discussed herein a UE may select between various resource selection methods. These may include (but are not limited to) a full sensing method, a partial sensing method, a method incorporating partial sensing plus additional sensing, a method incorporating partial sensing with resource re-evaluation and/or resource pre-emption, a method incorporating partial sensing with resource re-evaluation and/or resource pre-emption using modified sensing windows, a method incorporating random resource selection, a method incorporating random resource selection plus additional sensing, a method incorporating random resource selection with resource re-evaluation and/or resource pre-emption, and a method incorporating random resource selection with resource re-evaluation and/or resource pre-emption using modified sensing windows.

Further, according to embodiments discussed herein, the UE may make a determination among these resource selection methods depending on, for example, UE power level, UE power capability, UE priority, a priority of data to be sent by the UE on the SL, a resource pool configuration, a PC5-RRC configuration, and/or a congestion level within the wireless communication system.

Figure 15:
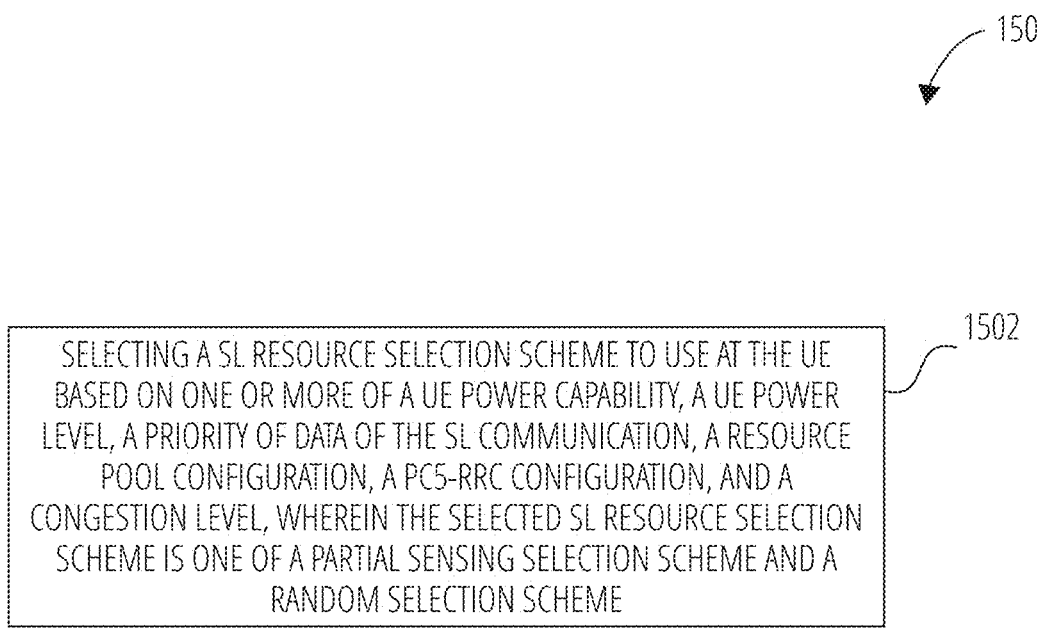
FIG. 15 illustrates a method of a UE operating in a reduced sensing mode for SL communication, according to an embodiment.

FIG. 15 illustrates a method 1500 of a UE operating in a reduced sensing mode for SL communication, according to an embodiment.

The method 1500 includes selecting 1502 a SL resource selection scheme to use at the UE based on one or more of a UE power capability, a UE power level, a priority of data of the SL communication, a resource pool configuration, a PC5-RRC configuration, and a congestion level, wherein the selected SL resource selection scheme is one of a partial sensing selection scheme and a random selection scheme.

In some embodiments of the method 1500, the partial sensing selection scheme is one of a pure partial sensing scheme, a partial sensing plus additional sensing scheme, a partial sensing with resource re-evaluation sensing scheme, and a partial sensing with resource re-evaluation based on a modified sensing window scheme.

In some embodiments of the method 1500, the random selection scheme is one of a pure random selection scheme, a random selection plus additional sensing selection scheme, a random selection with resource re-evaluation selection scheme, and a random selection with resource re-evaluation based on a modified sensing window scheme.

Embodiments contemplated herein include an apparatus comprising means to perform one or more elements of the method 1500. This apparatus may be, for example, an apparatus of a UE 1600 as described below.

Embodiments contemplated herein include one or more non-transitory computer-readable media comprising instructions to cause an electronic device, upon execution of the instructions by one or more processors of the electronic device, to perform one or more elements of the method 1500. This non-transitory computer-readable media may be, for example, the memory 1606 of the UE 1600 described below, and/or the peripheral devices 1904, the memory/storage devices 1914, and/or the databases 1920 of the components 1900 as described below.

Embodiments contemplated herein include an apparatus comprising logic, modules, or circuitry to perform one or more elements of the method 1500. This apparatus may be, for example, an apparatus of a UE 1600 as described below.

Embodiments contemplated herein include an apparatus comprising: one or more processors and one or more computer-readable media comprising instructions that, when executed by the one or more processors, cause the one or more processors to perform one or more elements of the method 1500. This apparatus may be, for example, an apparatus of a UE 1600 as described below.

Embodiments contemplated herein include a signal as described in or related to one or more elements of the method 1500.

Embodiments contemplated herein include a datagram, packet, frame, segment, protocol data unit (PDU), or message as described in or related to one or more elements of the method 1500.

Embodiments contemplated herein include a signal encoded with data as described in or related to one or more elements of the method 1500.

Embodiments contemplated herein include a signal encoded with a datagram, packet, frame, segment, PDU, or message as described in or related to one or more elements of the method 1500.

Embodiments contemplated herein include an electromagnetic signal carrying computer-readable instructions, wherein execution of the computer-readable instructions by one or more processors is to cause the one or more processors to perform one or more elements of the method 1500.

Embodiments contemplated herein include a computer program comprising instructions, wherein execution of the program by a processing element is to cause the processing element to carry out one or more elements of the method 1500. These instructions may be, for example, the instructions processor 1908 and/or the instructions 1912 of the components 1900 as described below.

Figure 16:
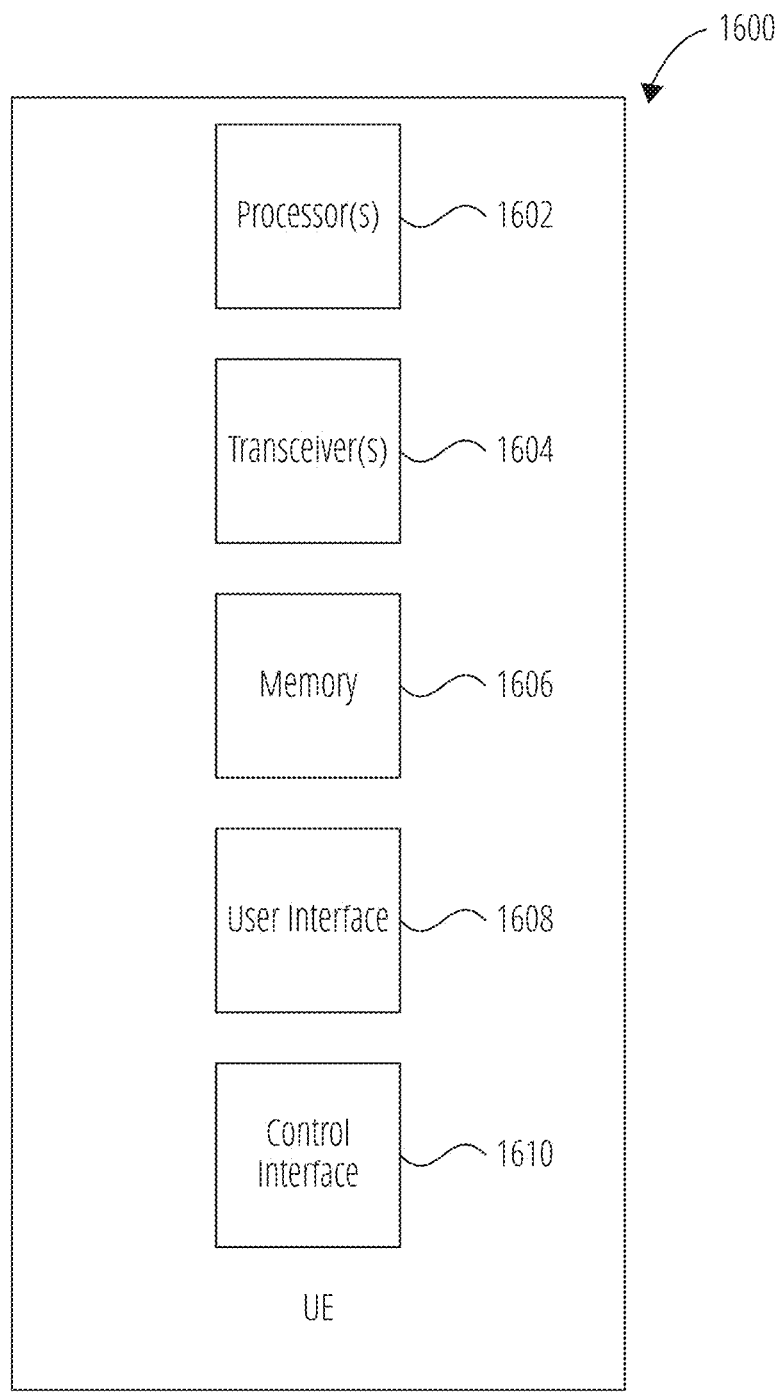
FIG. 16 illustrates a UE in accordance with one embodiment.

FIG. 16 is a block diagram of an example UE 1600 configurable according to various embodiments of the present disclosure, including by execution of instructions on a computer-readable medium that correspond to any of the example methods and/or procedures described herein. The UE 1600 comprises one or more processor 1602, transceiver 1604, memory 1606, user interface 1608, and control interface 1610.

The one or more processor 1602 may include, for example, an application processor, an audio digital signal processor, a central processing unit, and/or one or more baseband processors. Each of the one or more processor 1602 may include internal memory and/or may include interface(s) to communication with external memory (including the memory 1606). The internal or external memory can store software code, programs, and/or instructions for execution by the one or more processor 1602 to configure and/or facilitate the UE 1600 to perform various operations, including operations described herein. For example, execution of the instructions can configure the UE 1600 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1604, user interface 1608, and/or control interface 1610. As another example, the one or more processor 1602 may execute program code stored in the memory 1606 or other memory that corresponds to MAC, RLC, PDCP, and RRC layer protocols standardized by 3GPP (e.g., for NR and/or LTE). As a further example, the processor 1602 may execute program code stored in the memory 1606 or other memory that, together with the one or more transceiver 1604, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1606 may comprise memory area for the one or more processor 1602 to store variables used in protocols, configuration, control, and other functions of the UE 1600, including operations corresponding to, or comprising, any of the example methods and/or procedures described herein. Moreover, the memory 1606 may comprise non-volatile memory (e.g., flash memory), volatile memory (e.g., static or dynamic RAM), or a combination thereof. Furthermore, the memory 1606 may interface with a memory slot by which removable memory cards in one or more formats (e.g., SD Card, Memory Stick, Compact Flash, etc.) can be inserted and removed.

The one or more transceiver 1604 may include radio-frequency transmitter and/or receiver circuitry that facilitates the UE 1600 to communicate with other equipment supporting like wireless communication standards and/or protocols. For example, the one or more transceiver 1604 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1602. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1604 includes a transmitter and a receiver that enable UE 1600 to communicate with various 5G/NR networks according to various protocols and/or methods proposed for standardization by 3 GPP and/or other standards bodies. For example, such functionality can operate cooperatively with the one or more processor 1602 to imple-ment a PHY layer based on OFDM, OFDMA, and/or SC-FDMA technologies, such as described herein with respect to other figures.

The user interface 1608 may take various forms depending on particular embodiments, or can be absent from the UE 1600. In some embodiments, the user interface 1608 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1600 may comprise a tablet computing device including a larger touchscreen display. In such embodiments, one or more of the mechanical features of the user interface 1608 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1600 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1600 having a touch screen display are capable of receiving user inputs, such as inputs related to exemplary methods and/or procedures described herein or otherwise known to persons of ordinary skill in the art.

In some exemplary embodiments of the present disclosure, the UE 1600 may include an orientation sensor, which can be used in various ways by features and functions of the UE 1600. For example, the UE 1600 can use outputs of the orientation sensor to determine when a user has changed the physical orientation of the UE 1600's touch screen display. An indication signal from the orientation sensor can be available to any application program executing on the UE 1600, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1610 may take various forms depending on particular embodiments. For example, the control interface 1610 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 1610 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1600 may include more functionality than is shown in FIG. 16 including, for example, a video and/or still-image camera, microphone, media player and/or recorder, etc. Moreover, the one or more transceiver 1604 may include circuitry for communication using additional radio-frequency communication standards including Bluetooth, GPS, and/or others. Moreover, the one or more processor 1602 may execute software code stored in the memory 1606 to control such additional functionality. For example, directional velocity and/or position estimates output from a GPS receiver can be available to any application program executing on the UE 1600, including various exemplary methods and/or computer-readable media according to various exemplary embodiments of the present disclosure.

Figure 17:
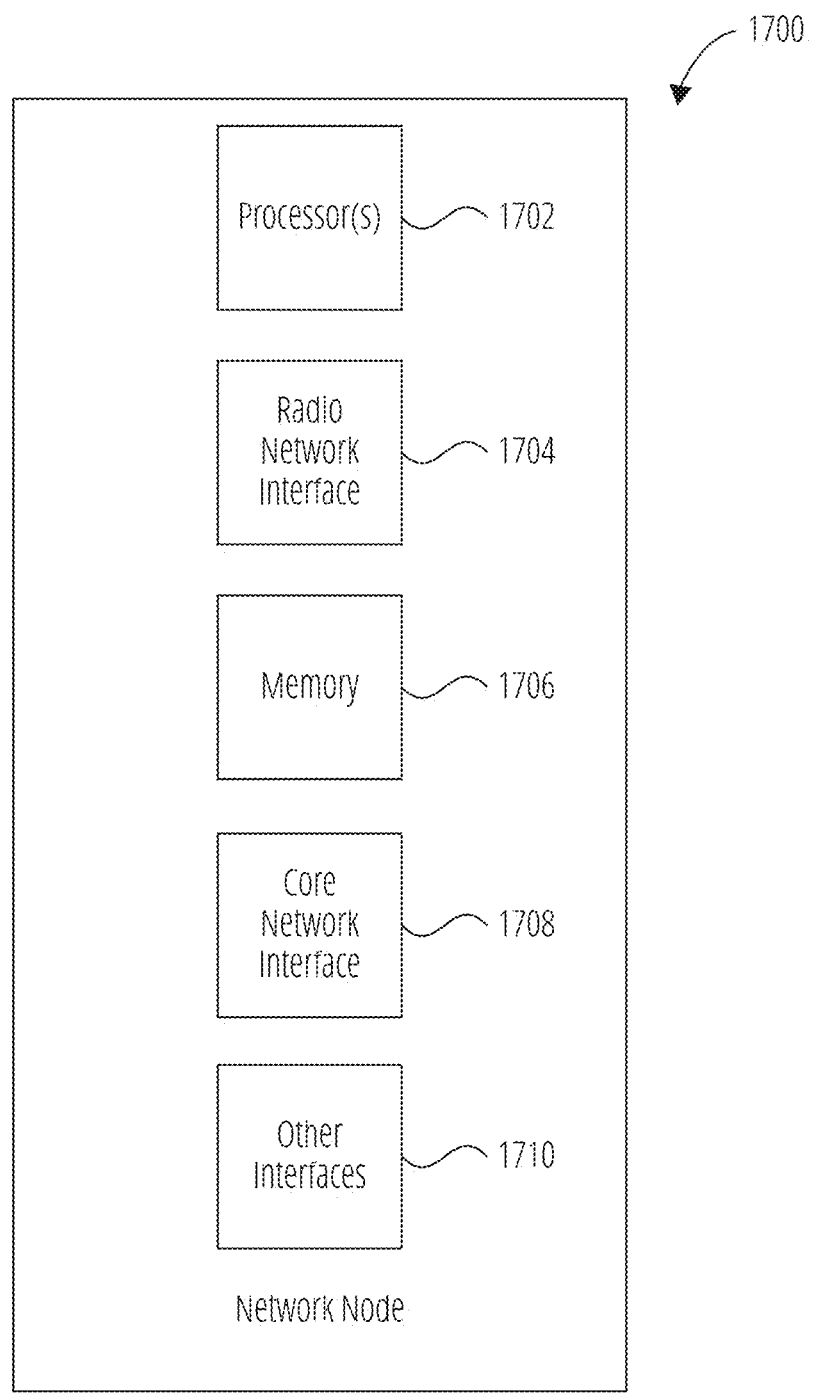
FIG. 17 illustrates a network node in accordance with one embodiment.

FIG. 17 is a block diagram of an example network node 1700 configurable according to various embodiments of the present disclosure, including by execution of instructions on a computer-readable medium that correspond to any of the example methods and/or procedures described herein.

The network node 1700 includes a one or more processor 1702, a radio network interface 1704, a memory 1706, a core network interface 1708, and other interfaces 1710. The network node 1700 may comprise, for example, a base station, eNB, gNB, access node, or component thereof.

The one or more processor 1702 may include any type of processor or processing circuitry and may be configured to perform an of the methods or procedures disclosed herein. The memory 1706 may store software code, programs, and/or instructions executed by the one or more processor 1702 to configure the network node 1700 to perform various operations, including operations described herein. For example, execution of such stored instructions can configure the network node 1700 to communicate with one or more other devices using protocols according to various embodiments of the present disclosure, including one or more methods and/or procedures discussed above. Furthermore, execution of such stored instructions can also configure and/or facilitate the network node 1700 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1704 and the core network interface 1708. By way of example and without limitation, the core network interface 1708 comprise an S1 interface and the radio network interface 1704 may comprise a Uu interface, as standardized by 3GPP. The memory 1706 may also store variables used in protocols, configuration, control, and other functions of the network node 1700. As such, the memory 1706 may comprise non-volatile memory (e.g., flash memory, hard disk, etc.), volatile memory (e.g., static or dynamic RAM), network-based (e.g., "cloud") storage, or a combination thereof.

The radio network interface 1704 may include transmitters, receivers, signal processors, ASICs, antennas, beamforming units, and other circuitry that enables network node 1700 to communicate with other equipment such as, in some embodiments, a plurality of compatible user equipment (UE). In some embodiments, the network node 1700 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1704 may include a PHY layer based on OFDM, OFDMA, and/or SC-FDMA technologies. In some embodiments, the functionality of such a PHY layer can be provided cooperatively by the radio network interface 1704 and the one or more processor 1702.

The core network interface 1708 may include transmitters, receivers, and other circuitry that enables the network node 1700 to communicate with other equipment in a core network such as, in some embodiments, circuit-switched (CS) and/or packet-switched Core (PS) networks. In some embodiments, the core network interface 1708 may include the S1 interface standardized by 3GPP. In some embodiments, the core network interface 1708 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1708 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1710 may include transmitters, receivers, and other circuitry that enables the network node 1700 to communicate with external networks, computers, databases, and the like for purposes of operations, administration, and maintenance of the network node 1700 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 18:
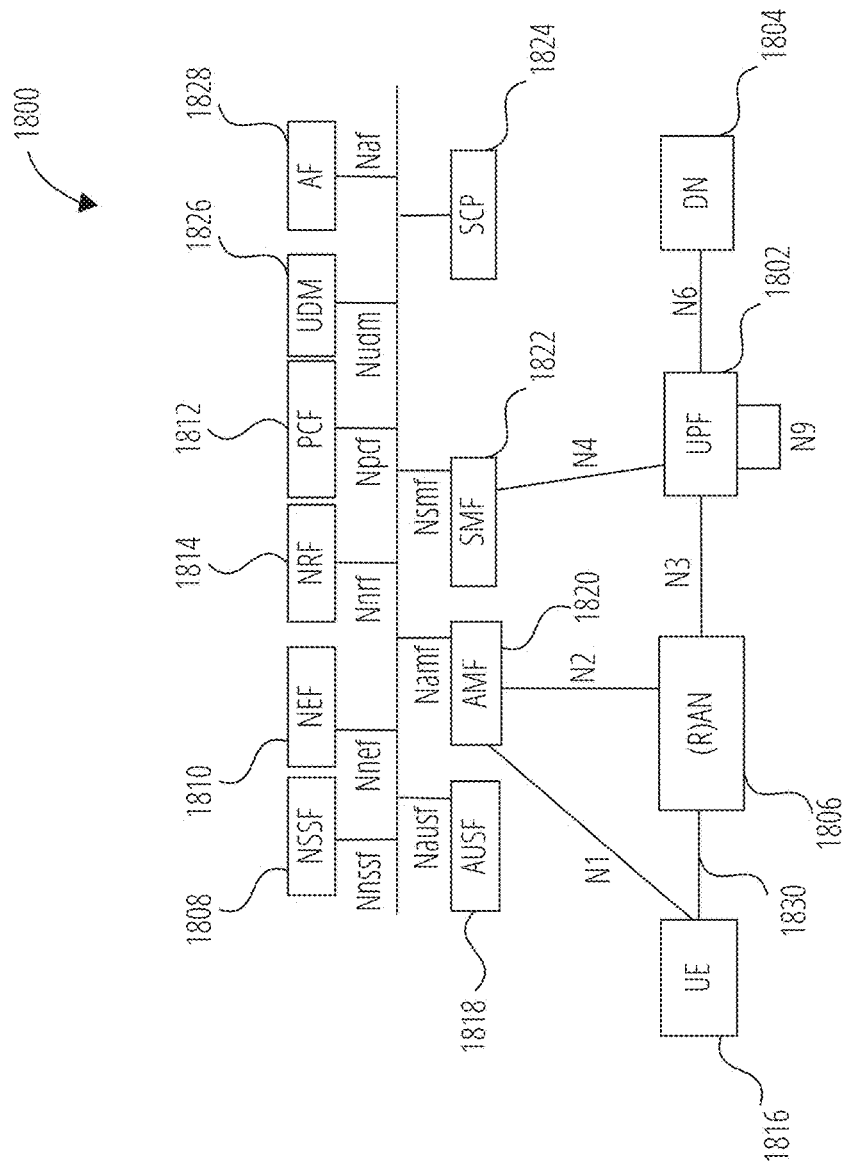
FIG. 18 illustrates an example service based architecture in accordance with certain embodiments.

FIG. 18 illustrates a service based architecture 1800 in 5GS according to one embodiment. As described in 3GPP TS 23.501, the service based architecture 1800 comprises NFs such as an NSSF 1808, a NEF 1810, an NRF 1814, a PCF 1812, a UDM 1826, an AUSF 1818, an AMF 1820, an SMF 1822, for communication with a UE 1816, a (R)AN 1806, a UPF 1802, and a DN 1804. The NFs and NF services can communicate directly, referred to as Direct Communication, or indirectly via a SCP 1824, referred to as Indirect Communication. FIG. 18 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 18 are described below.

The NSSF 1808 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1810 supports exposure of capabilities and events. NF capabilities and events may be securely exposed by the NEF 1810 (e.g., for 3rd party, Application Functions, and/or Edge Computing). The NEF 1810 may store/retrieve information as structured data using a standardized interface (Nudr) to a UDR. The NEF 1810 may also secure provision of information from an external application to 3GPP network and may provide for the Application Functions to securely provide information to the 3GPP network (e.g., expected UE behavior, 5GLAN group information, and service specific information), wherein the NEF 1810 may authenticate and authorize and assist in throttling the Application Functions. The NEF 1810 may provide translation of internal-external information by translating between information exchanged with the AF and information exchanged with the internal network function. For example, the NEF 1810 translates between an AF-Service-Identifier and internal 5G Core information such as DNN and S-NSSAI. The NEF 1810 may handle masking of network and user sensitive information to external AF's according to the network policy. The NEF 1810 may receive information from other network functions (based on exposed capabilities of other network functions), and stores the received information as structured data using a standardized interface to a UDR. The stored information can be accessed and re-exposed by the NEF 1810 to other network functions and Application Functions, and used for other purposes such as analytics. For external exposure of services related to specific UE(s), the NEF 1810 may reside in the HPLMN. Depending on operator agreements, the NEF 1810 in the HPLMN may have interface(s) with NF(s) in the VPLMN. When a UE is capable of switching between EPC and 5GC, an SCEF+NEF may be used for service exposure.

The NRF 1814 supports service discovery function by receiving an NF Discovery Request from an NF instance or SCP and providing the information of the discovered NF instances to the NF instance or SCP. The NRF 1814 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1812 supports a unified policy framework to govern network behavior. The PCF 1812 provides policy rules to Control Plane function(s) to enforce them. The PCF 1812 accesses subscription information relevant for policy decisions in a Unified Data Repository (UDR). The PCF 1812 may access the UDR located in the same PLMN as the PCF.

The UDM 1826 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1826 uses subscription data (including authentication data) that may be stored in a UDR, in which case a UDM implements the application logic and may not require an internal user data storage and several different UDMs may serve the same user in different transactions. The UDM 1826 may be located in the HPLMN of the subscribers it serves, and may access the information of the UDR located in the same PLMN.

The AUSF 1818 supports authentication for 3GPP access and untrusted non-3GPP access. The AUSF 1818 may also provide support for Network Slice-Specific Authentication and Authorization.

The AMF 1820 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1820. Regardless of the number of Network functions, in certain embodiments there is only one NAS interface instance per access network between the UE and the CN, terminated at one of the Network functions that implements at least NAS security and Mobility Management. The AMF 1820 may also include policy related functionalities.

In addition to the functionalities described above, the AMF 1820 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1822 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1822 may include policy related functionalities.

The SCP 1824 includes one or more of the following functionalities. Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1824 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1816 may include a device with radio communication capabilities. For example, the UE 1816 may comprise a smartphone (e.g., handheld touchscreen mobile computing devices connectable to one or more cellular networks). The UE 1816 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1816 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1816 may be configured to connect or communicatively couple with the (R)AN 1806 through a radio interface 1830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1816 and the (R)AN 1806 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 1806 to the UE 1816 and a UL transmission may be from the UE 1816 to the (R)AN 1806. The UE 1816 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1806 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1806 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1806) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1816 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1802 may act as an anchor point for intra-RAT and inter-RAT mobility, an external PDU session point of interconnect to the DN 1804, and a branching point to support multi-homed PDU session. The UPF 1802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1802 may include an uplink classifier to support routing traffic flows to a data network. The DN 1804 may represent various network operator services, Internet access, or third party services. The DN 1804 may include, for example, an application server.

Figure 19:
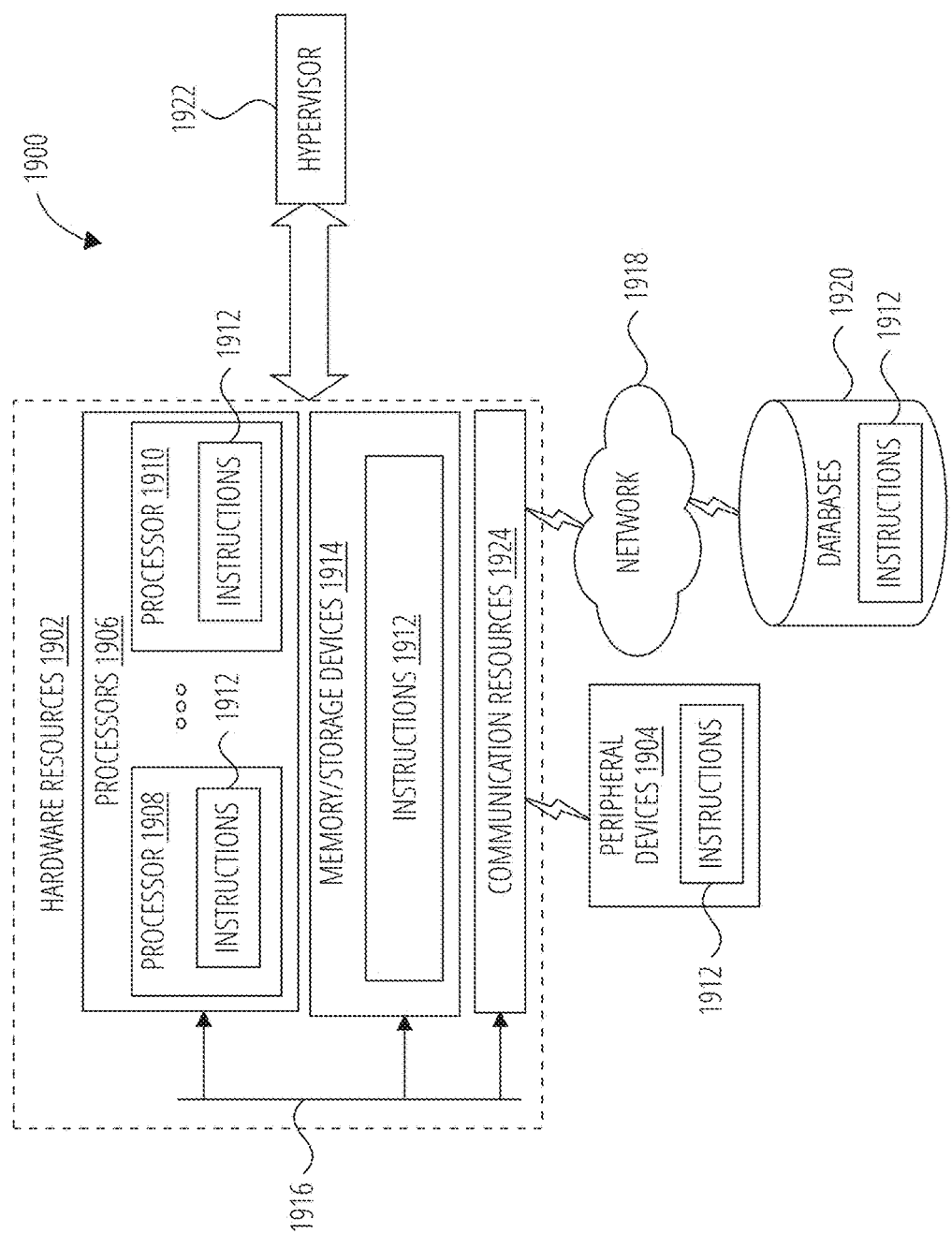
FIG. 19 illustrates components in accordance with one embodiment.

FIG. 19 is a block diagram illustrating components 1900, according to some example embodiments, able to read instructions from a machine-readable or computer-readable medium (e.g., a non-transitory machine-readable storage medium) and perform any one or more of the methodologies discussed herein. Specifically, FIG. 19 shows a diagrammatic representation of hardware resources 1902 including one or more processors 1906 (or processor cores), one or more memory/storage devices 1914, and one or more communication resources 1924, each of which may be communicatively coupled via a bus 1916. For embodiments where node virtualization (e.g., NFV) is utilized, a hypervisor 1922 may be executed to provide an execution environment for one or more network slices/sub-slices to utilize the hardware resources 1902.

The processors 1906 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1908 and a processor 1910.

The memory/storage devices 1914 may include main memory, disk storage, or any suitable combination thereof. The memory/storage devices 1914 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1924 may include interconnection or network interface components or other suitable devices to communicate with one or more peripheral devices 1904 or one or more databases 1920 via a network 1918. For example, the communication resources 1924 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1912 may comprise software, a program, an application, an applet, an app, or other executable code for causing at least any of the processors 1906 to perform any one or more of the methodologies discussed herein. The instructions 1912 may reside, completely or partially, within at least one of the processors 1906 (e.g., within the processor's cache memory), the memory/storage devices 1914, or any suitable combination thereof. Furthermore, any portion of the instructions 1912 may be transferred to the hardware resources 1902 from any combination of the peripheral devices 1904 or the databases 1920. Accordingly, the memory of the processors 1906, the memory/storage devices 1914, the peripheral devices 1904, and the databases 1920 are examples of computer-readable and machine-readable media.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE) for transmitting data on a sidelink (SL) transmission, comprising:
    detecting, for each of one or more resources from a candidate slot, whether any other device has reserved the resource, wherein the detecting is performed during one or more detection occasions that occur according to one or more of a plurality of resource reservation periods configured for a resource pool of the one or more resources; and
    for each of the one or more resources from the candidate slot:
        in response to determining, based on the detecting, that no other device has reserved the resource, selecting the resource for use with the SL transmission; and
        in response to determining, based on the detecting, that another device has reserved the resource, not selecting the resource for use with the SL transmission.

2. The method of claim 1, wherein the candidate slot extends for less than an entire resource selection window.

3. The method of claim 1, wherein the one or more of the plurality of the resource reservation periods for the one or more detection occasions is a subset of all resource reservation periods configured for the resource pool.

4. The method of claim 3, wherein the one or more of the plurality of resource reservation periods for the one or more detection occasions is determined based on whether additional sensing occurs after a resource selection trigger.

5. The method of claim 3, wherein the one or more of the plurality of resource reservation periods for the one or more detection occasions is determined based on a priority of the data.

6. The method of claim 3, wherein the one or more of the plurality of resource reservation periods for the one or more detection occasions is determined based on a power level of the UE.

7. The method of claim 3, wherein the one or more of the plurality of resource reservation periods for the one or more detection occasions is determined based on a UE capability.

8. The method of claim 1, wherein the one or more detection occasions comprises a plurality of detection occasions that occur according to a same resource reservation period of the one or more of the plurality of resource reservation periods.

9. The method of claim 8, wherein a number of the plurality of detection occasions that occur according to the same resource reservation period is pre-configured for the resource pool of the one or more resources.

10. The method of claim 8, wherein a number of the plurality of detection occasions that occur according to the same resource reservation period is determined based on a priority of the data.

11. The method of claim 8, wherein a number of the plurality of detection occasions that occur according to the same resource reservation period is determined based on a power level of the UE.

12. The method of claim 8, wherein a number of the plurality of detection occasions that occur according to the same resource reservation period is determined based on a UE capability.

13. A baseband processor of a user equipment (UE) to transmit data on a sidelink (SL) transmission, the baseband processor comprising:
   circuitry configured to:
      detect, for each of one or more resources from a candidate slot, whether any other device has reserved the resource, wherein the detecting is performed during one or more detection occasions that occur according to one or more of a plurality of resource reservation periods configured for a resource pool of the one or more resources; and
      for each of the one or more resources from the candidate slot:
         in response to determining, based on the detecting, that no other device has reserved the resource, select the resource for use with the SL transmission; and
         in response to determining, based on the detecting, that another device has reserved the resource, not select the resource for use with the SL transmission.

14. The baseband processor of claim 13, wherein the candidate slot extends for less than an entire resource selection window.

15. The baseband processor of claim 13, wherein the one or more of the plurality of the resource reservation periods for the one or more detection occasions is a subset of all resource reservation periods configured for the resource pool.

16. The baseband processor of claim 15, wherein the one or more of the plurality of resource reservation periods for the one or more detection occasions is determined based on whether additional sensing occurs after a resource selection trigger.

17. The baseband processor of claim 15, wherein the one or more of the plurality of resource reservation periods for the one or more detection occasions is determined based on a priority of the data.

18. The baseband processor of claim 15, wherein the one or more of the plurality of resource reservation periods for the one or more detection occasions is determined based on a power level of the UE.

19. The baseband processor of claim 15, wherein the one or more of the plurality of resource reservation periods for the one or more detection occasions is determined based on a UE capability.

20. A user equipment (UE) configured for transmitting data on a sidelink (SL) transmission, comprising:
   a memory to store the one or more resources from the candidate slot to use to transmit data on the SL transmission; and
   one or more processors configured to:
      detect, for each of one or more resources from a candidate slot, whether any other device has reserved the resource, wherein the detecting is performed during one or more detection occasions that occur according to one or more of a plurality of resource reservation periods configured for a resource pool of the one or more resources; and
      for each of the one or more resources from the candidate slot:
         in response to determining, based on the detecting, that no other device has reserved the resource, select the resource for use with the SL transmission; and
         in response to determining, based on the detecting, that another device has reserved the resource, not select the resource for use with the SL transmission.

* * * * *